United States Patent
Chenchev et al.

(10) Patent No.: US 10,018,848 B2
(45) Date of Patent: Jul. 10, 2018

(54) DISPLAY DEVICE, CONTROL METHOD FOR DISPLAY DEVICE, AND COMPUTER PROGRAM

(71) Applicant: SEIKO EPSON CORPORATION, Tokyo (JP)

(72) Inventors: Margarit Chenchev, Vaughan (CA); Guoyi Fu, Vaughan (CA); Jia Li, Aurora (CA); Shinya Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/092,925

(22) Filed: Apr. 7, 2016

(65) Prior Publication Data

US 2016/0313561 A1    Oct. 27, 2016

(30) Foreign Application Priority Data

Apr. 21, 2015    (JP) .................................. 2015-086603

(51) Int. Cl.
*G09G 5/00* (2006.01)
*G02B 27/01* (2006.01)

(52) U.S. Cl.
CPC ..... *G02B 27/0179* (2013.01); *G02B 27/0172* (2013.01); *G02B 27/0176* (2013.01); *G02B 2027/014* (2013.01); *G02B 2027/0138* (2013.01); *G02B 2027/0154* (2013.01)

(58) Field of Classification Search
None
See application file for complete search history.

(56) References Cited

U.S. PATENT DOCUMENTS

| | | |
|---|---|---|
| 2013/0050833 A1* | 2/2013 | Lewis ....................... G06T 7/73 |
| | | 359/630 |
| 2014/0184496 A1 | 7/2014 | Gribetz et al. |
| 2014/0333665 A1 | 11/2014 | Sylvan et al. |
| 2015/0002394 A1* | 1/2015 | Cho ................... G02B 27/0093 |
| | | 345/156 |

FOREIGN PATENT DOCUMENTS

JP     2005-038321 A     2/2005

OTHER PUBLICATIONS

Jun. 14, 2017 Office Action Issued in U.S. Appl. No. 15/092,041.
Jan. 23, 2018 Office Action issued in U.S. Appl. No. 15/092,041.

* cited by examiner

*Primary Examiner* — Stephen T Reed
(74) *Attorney, Agent, or Firm* — Oliff PLC

(57) ABSTRACT

A virtual image display device configuring a display device includes a display section configured to display an image while enabling visual recognition of an outside scene. The virtual image display device includes an image pickup section configured to pickup an image in an image pickup range that overlaps a range visually recognized through the display section. The virtual image display device includes a coupling section including at least one movable section and configured to couple the image pickup section to the display section. The display device is capable of acquiring a motion amount in the movable section with a control section.

12 Claims, 21 Drawing Sheets

DISPLAY DEVICE, CONTROL METHOD FOR DISPLAY DEVICE, AND COMPUTER PROGRAM

BACKGROUND

1. Technical Field

The present invention relates to a display device, a control method for the display device, and a computer program.

2. Related Art

There has been known a display device such as an HMD (Head Mounted Display) mounted on the head of a user (see, for example, JP-A-2005-38321 (Patent Literature 1). As the display device of this type, there has been a display device that includes an image pickup section such as a video camera and uses a picked-up image for display. For example, the HMD described in Patent Literature 1 includes a slider that moves an image pickup section in the up-down direction with respect to the HMD.

In the configuration described in Patent Literature 1, the user moves the video camera to change a visual point of a CG to be displayed. On the other hand, to prevent a display image from changing even if the image pickup section moves, it is necessary to detect the movement of the image pickup section. As a method of detecting the movement of the image pickup section, in Patent Literature 1, for example, an image output from the image pickup section is analyzed to calculate a position and a posture. However, the movement of the image pickup section cannot be accurately detected simply by analyzing the image.

SUMMARY

An advantage of some aspects of the invention is to provide a display device including an image pickup section and capable of detecting a movement of the image pickup section, a control method for the display device, and a computer program.

An aspect of the invention is directed to a display device including: a display section configured to display an image while enabling visual recognition of an outside scene; an image pickup section configured to pick up an image in an image pickup range that overlaps a range visually recognized through the display section; and a coupling section including at least one movable section and configured to couple the image pickup section to the display section. The display device is configured to be capable of acquiring a motion amount in the movable section.

According to the aspect of the invention, it is possible to displace the image pickup section with the movable section and detect the displacement of the image pickup section.

In the display device according to another aspect of the invention, the display device may further include: a detecting section provided in the movable section and configured to detect the motion amount in the movable section; and a control section configured to detect a positional relationship between the image pickup section and the display section on the basis of a detection result of the detecting section.

According to the aspect of the invention with this configuration, it is possible to highly accurately detect the relative positions of the image pickup section and the display section by detecting the motion amount in the movable section.

In the display device according to another aspect of the invention, at least a part of the movable section may be a turnable turning section, and the detecting section may detect a turning amount in the turning section.

According to the aspect of the invention with this configuration, it is more highly accurately detect the relative displacement of the image pickup section relative to the display section.

In the display device according to another aspect of the invention, the movable section may be configured to be capable of moving stepwise, and the detecting section may be configured to detect the motion in the movable section stepwise.

In the display device according to another aspect of the invention, the display device may further include a driving section configured to move the movable section, and the control section may acquire a motion amount in the movable section on the basis of the motion amount of the driving section.

According to the aspect of the invention with this configuration, it is possible to obtain the motion amount in the movable section from the motion amount of the driving section.

In the display device according to another aspect of the invention, the driving section may be configured to move the movable section stepwise.

Still another aspect of the invention is directed to a display device including: a display section configured to display an image while enabling visual recognition of an outside scene; an image pickup section configured to pick up an image in an image pickup range that overlaps a range visually recognized through the display section; a coupling section including at least one movable section and configured to couple the image pickup section to the display section; a first movement detecting section configured to detect a movement of the display section; and a second movement detecting section configured to detect a movement of the image pickup section.

According to the aspect of the invention, in the display device capable of displacing the image pickup section with the movable section, it is possible to highly accurately detect the displacement of the image pickup section using the movement detecting sections.

In the display device according to another aspect of the invention, the first movement detecting section may include a first inertial sensor fixed to the display section, and the second movement detecting section may include a second inertial sensor fixed to the image pickup section.

According to the aspect of the invention with this configuration, it is possible to highly accurately detect the displacement of the image pickup section with respect to the display section using the plurality of inertial sensors.

In the display device according to another aspect of the invention, the display device may further include: a motion-amount detecting section provided in the movable section and configured to detect a motion amount in the movable section; and a control section configured to detect a positional relationship between the image pickup section and the display section on the basis of detection results of the first movement detecting section, the second movement detecting section, and the motion-amount detecting section.

According to the aspect of the invention with this configuration, it is possible to more highly accurately detect the displacement of the image pickup section with respect to the display section using the detection results of the plurality of detecting sections.

Still another aspect of the invention is directed to a control method for a display device including: a display section configured to display an image while enabling visual recognition of an outside scene; an image pickup section configured to pick up an image in an image pickup range that overlaps a range visually recognized through the display section; and a coupling section including at least one movable section and configured to couple the image pickup section to the display section, the control method including acquiring a motion amount in the movable section and detecting a positional relationship between the image pickup section and the display section.

According to the aspect of the invention, in the display device capable of displacing the image pickup section with the movable section, it is possible to detect the displacement of the image pickup section.

Yet another aspect of the invention is directed to a control method for a display device including: a display section configured to display an image while enabling visual recognition of an outside scene; an image pickup section configured to pick up an image in an image pickup range that overlaps a range visually recognized through the display section; and a coupling section including at least one movable section and configured to couple the image pickup section to the display section, the control method including acquiring a motion amount in the movable section and detecting a positional relationship between the image pickup section and the display section on the basis of detection results of a first movement detecting section configured to detect a movement of the display section and a second movement detecting section configured to detect a movement of the image pickup section.

According to the aspect of the invention, in the display device capable of displacing the image pickup section with the movable section, it is possible to highly accurately detect the displacement of the image pickup section using the movement detecting sections.

Still yet another aspect of the invention is directed to a computer program executable by a computer that controls a display device including: a display section configured to display an image while enabling visual recognition of an outside scene; an image pickup section configured to pick up an image in an image pickup range that overlaps a range visually recognized through the display section; and a coupling section including at least one movable section and configured to couple the image pickup section to the display section, the computer program causing the computer to realize at least functions of acquiring a motion amount in the movable section and detecting a positional relationship between the image pickup section and the display section.

According to the aspect of the invention, in the display device capable of displacing the image pickup section with the movable section, it is possible to detect the displacement of the image pickup section.

Further another aspect of the invention is directed to a computer program executable by a computer that controls a display device including: a display section configured to display an image while enabling visual recognition of an outside scene; an image pickup section configured to pick up an image in an image pickup range that overlaps a range visually recognized through the display section; and a coupling section including at least one movable section and configured to couple the image pickup section to the display section, the computer program causing the computer to realize at least a function of acquiring a motion amount in the movable section and detecting a positional relationship between the image pickup section and the display section on the basis of detection results of a first movement detecting section configured to detect a movement of the display section and a second movement detecting section configured to detect a movement of the image pickup section.

According to the aspect of the invention, in the display device capable of displacing the image pickup section with the movable section, it is possible to highly accurately detect the displacement of the image pickup section using the movement detecting sections.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment applied with the invention is explained with reference to FIGS. 1 to 11.

Schematic Configuration of a Virtual Image Display Device

Figure 1:
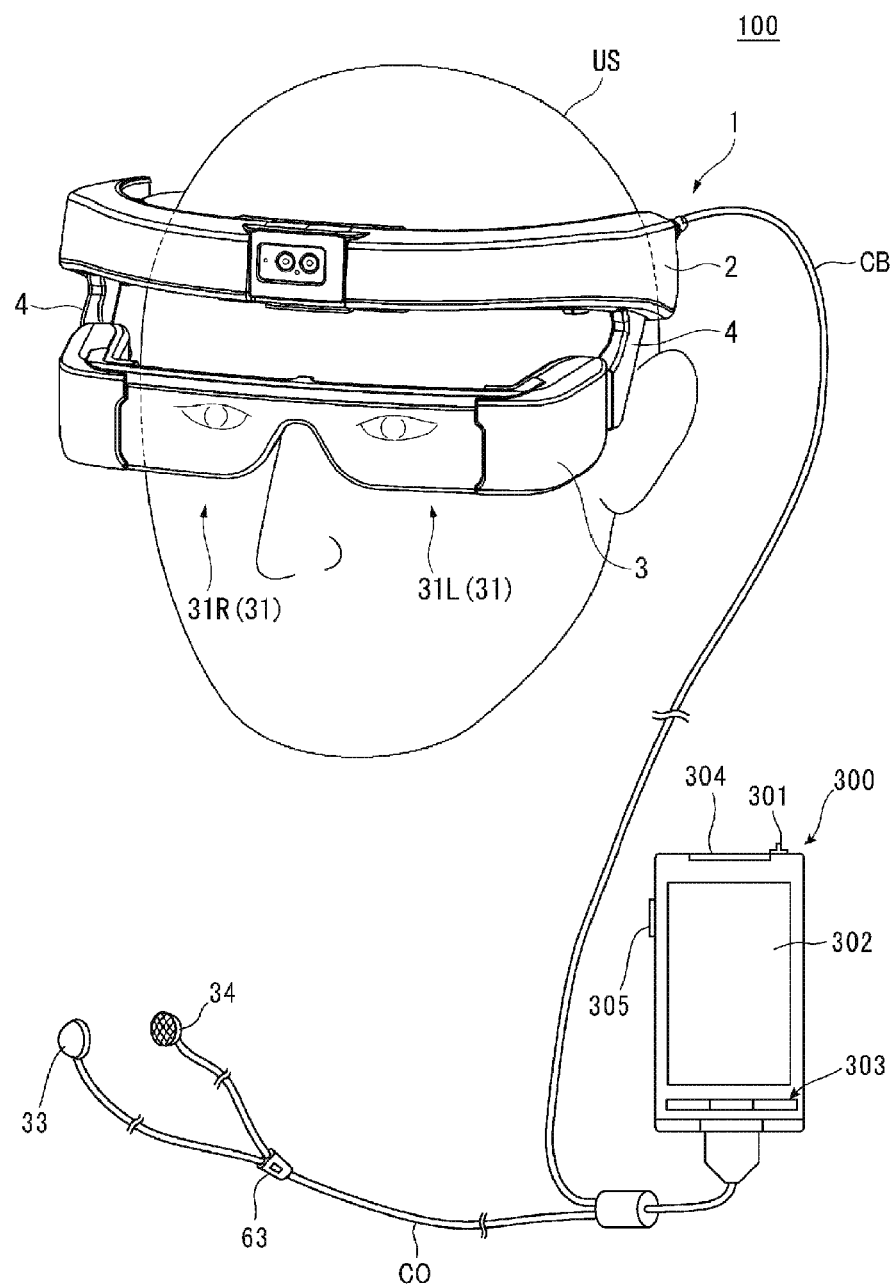
FIG. 1 is a perspective view showing an HMD in a first embodiment.
Figure 2:
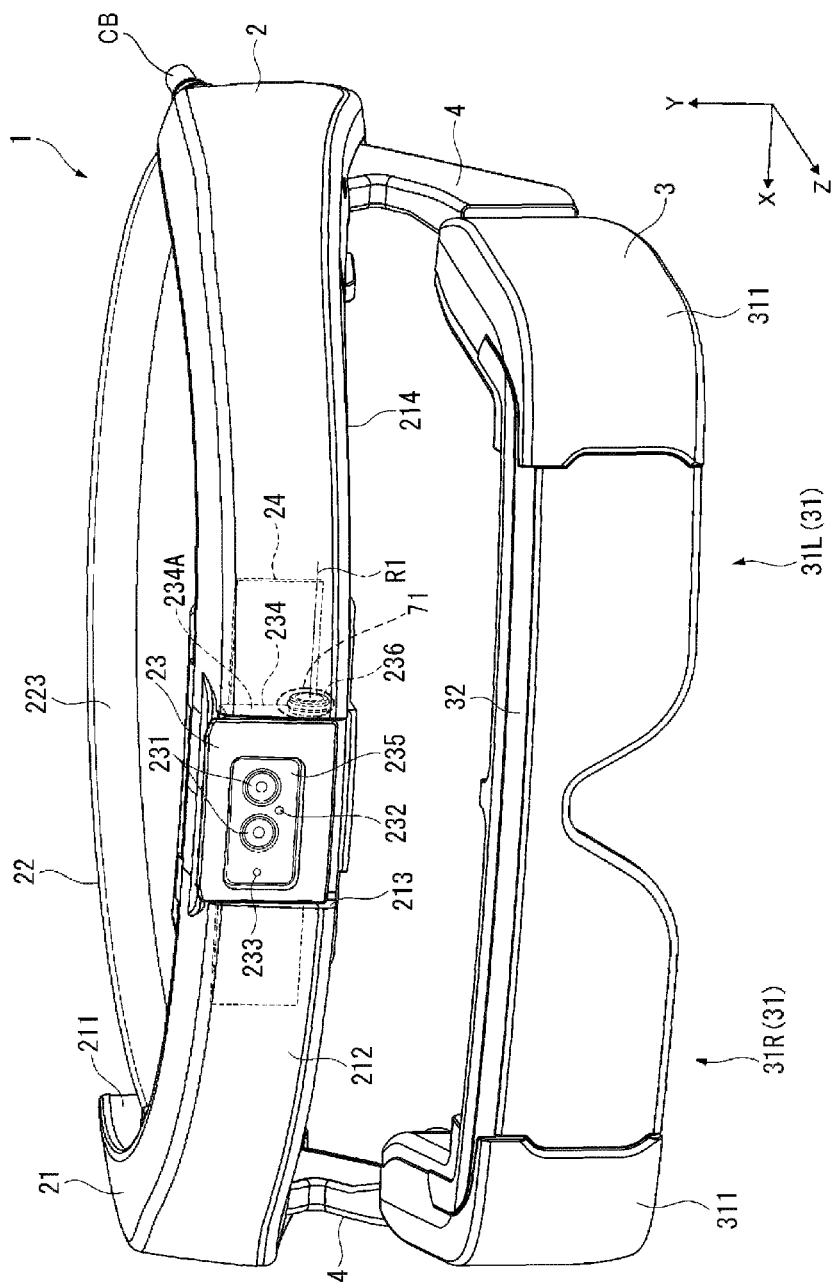
FIG. 2 is a perspective view showing a virtual image display device in the first embodiment.
Figure 3:
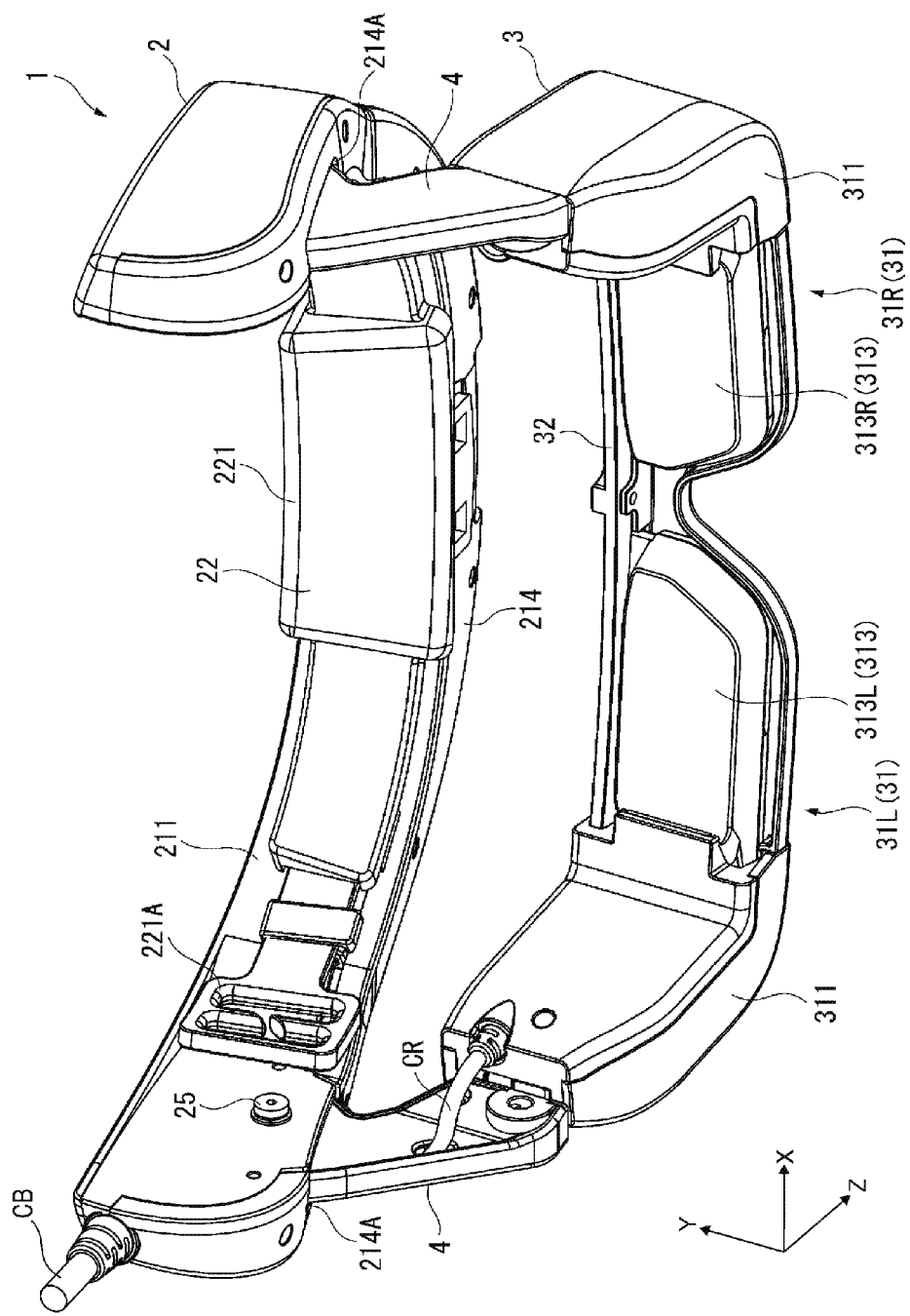
FIG. 3 is a perspective view showing the virtual image display device in the first embodiment.

FIG. 1 is a perspective view showing the configuration of an HMD (Head Mounted Display: a head-mounted display device) 100 according to this embodiment. FIG. 1 shows a state in which a virtual image display device 1 is worn by a user. FIGS. 2 and 3 are perspective views of the virtual image display device 1 viewed from the front side and the rear side. In other words, FIG. 2 is a perspective view of the virtual image display device 1 viewed from the opposite side of the user side and FIG. 3 is a perspective view of the virtual image display device 1 viewed from the user side.

The HMD 100 (a display device) includes the virtual image display device 1 that causes a user (an observer) US to visually recognize a virtual image in a state in which the virtual image display device 1 is worn on the head of the user US and a control device 300 that controls the virtual image display device 1. The control device 300 also functions as a controller with which the user US operates the HMD 100. In this specification, the virtual image visually recognized by the user US with the HMD 100 is referred to as "display image" for convenience. The virtual image display device 1 emitting image light generated on the basis of image data is referred to as "display an image" as well.

The virtual image display device 1 is connected to the control device 300 by a cable CB. The cable CB incorporates a power supply cable (not shown in the figure) for supplying electric power from the control device 300 to the virtual image display device 1 and a data communication cable (not shown in the figure) through which the virtual image display device 1 and the control device 300 transmit and receive various data.

Figure 10:
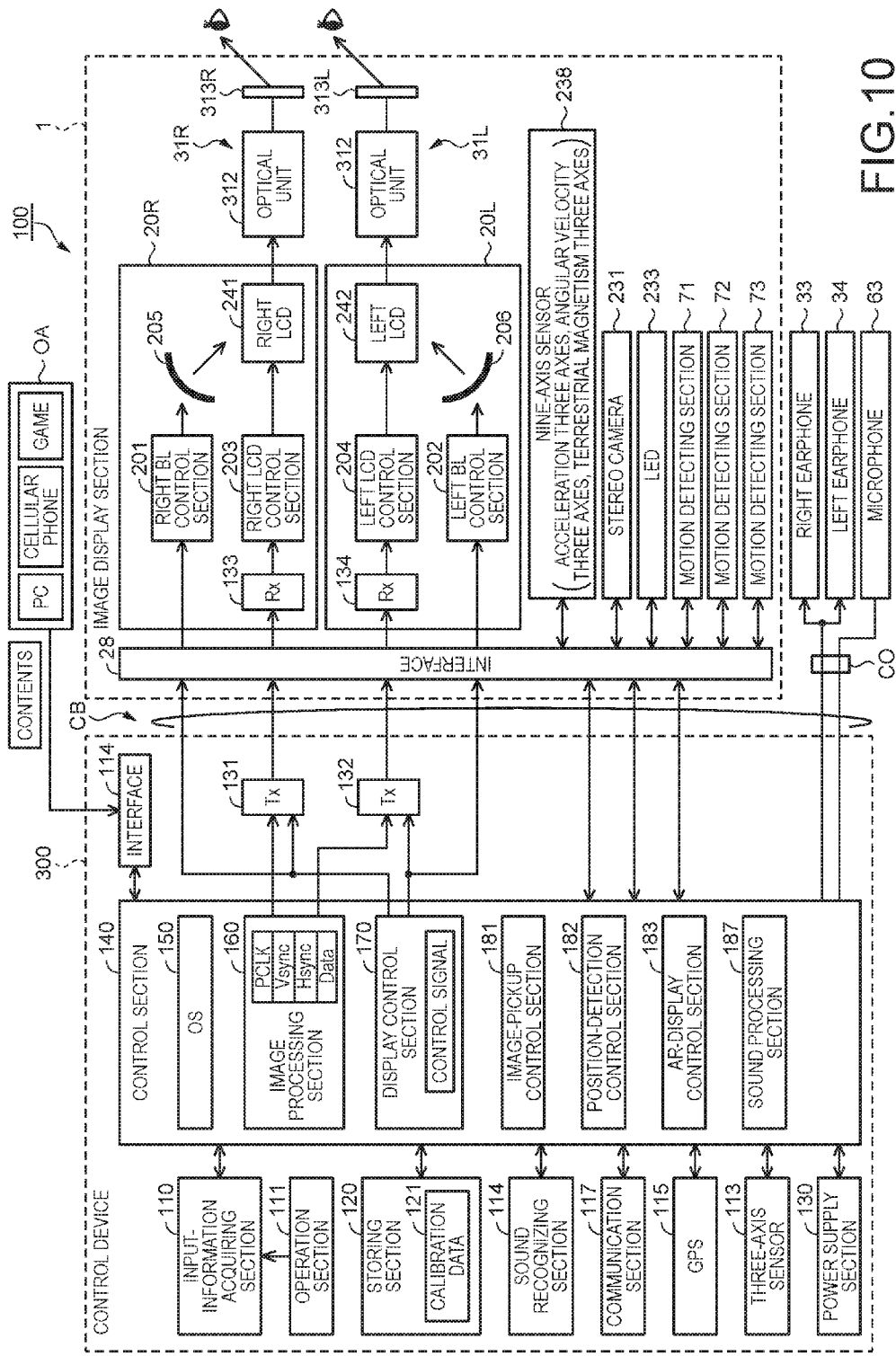
FIG. 10 is a functional block diagram of the HMD in the first embodiment.

An audio cable CO branching from the cable CB is connected to the control device 300. A right earphone 33 and a left earphone 34 and a microphone 63 are connected to the audio cable CO. The right earphone 33 and the left earphone 34 output sound on the basis of a sound signal output by a sound processing section 187 (FIG. 10).

The microphone 63 collects sound and outputs a sound signal to the sound processing section 187 (FIG. 10) explained below. The microphone 63 may be, for example, a monaural microphone or a stereo microphone, may be a microphone having directivity, or may be a nondirectional microphone.

When the virtual image display device 1 includes a power supply such as a battery, it is also possible to connect the virtual image display device 1 and the control device 300 by wireless communication.

Specifically, the virtual image display device 1 is a see-through type display device that displays a virtual image to be visually recognizable by the observer and transmits external light to enable observation of an outside world (an outside scene). The virtual image display device 1 includes, as shown in FIGS. 1 to 3, a headband section 2 functioning as a main body section worn on the head of the user US or a helmet or the like worn on the head, a display section 3 that displays a virtual image, a pair of arm sections 4 turnably attached to the headband section 2 to connect the headband section 2 and the display section 3, moving mechanisms 5 (see FIG. 6) for moving the display section 3 with respect to the arm section 4.

Note that in the following explanation, a Z direction is a viewing direction at the time when the user US wearing the virtual image display device 1 faces the front and an X direction and a Y direction are directions orthogonal to the Z direction and orthogonal to each other. Among the directions, the X direction is a direction from the left to the right viewed from the user US wearing the virtual image display device 1 and the Y direction is a direction from the bottom to the top. Further, a Z-direction side indicates a downstream side in the Z direction (a Z-direction distal end side). The opposite side of the Z direction indicates an upstream side in the Z direction (a Z-direction proximal end side). The same applies to the other directions.

Configuration of the Headband Section

One ends of the arm sections 4 explained below are attached to the headband section 2. The headband section 2 controls a part of functions in the virtual image display device 1.

The headband section 2 has an arcuate external shape conforming to the shape of the head of the user US. As shown in FIG. 2, the headband section 2 includes a main body case 21 disposed along the head of the user US, a band 22 functioning as a fixing section for fixing the headband section 2 to a fixed part such as the head of the user US or the helmet, an image pickup section 23, and a control board 24. Note that the fixed part is a position corresponding to the head of the user US (specifically, a part further on the upper side than an outer peripheral line of the head passing the eyebrows and the ears). The helmet or the like may be interposed between the head and the headband section 2.

The control board 24 is connected to the control device 300 by the cable CB. The control board 24 is mounted with, for example, a circuit (not shown in the figure) incidental to a stereo camera 231 of the image pickup section 23.

Figure 4:
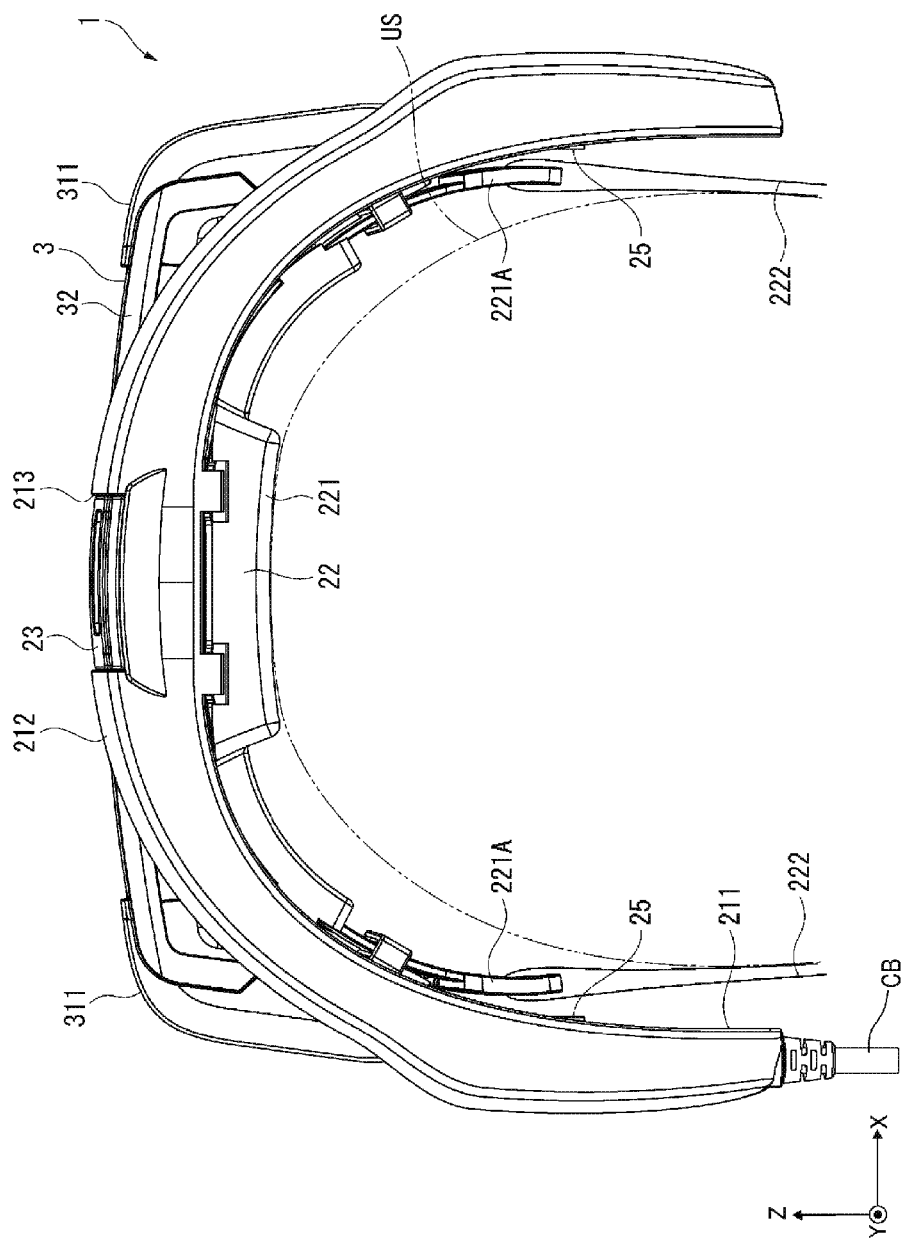
FIG. 4 is a top view showing the virtual image display device in the first embodiment.
Figure 5:
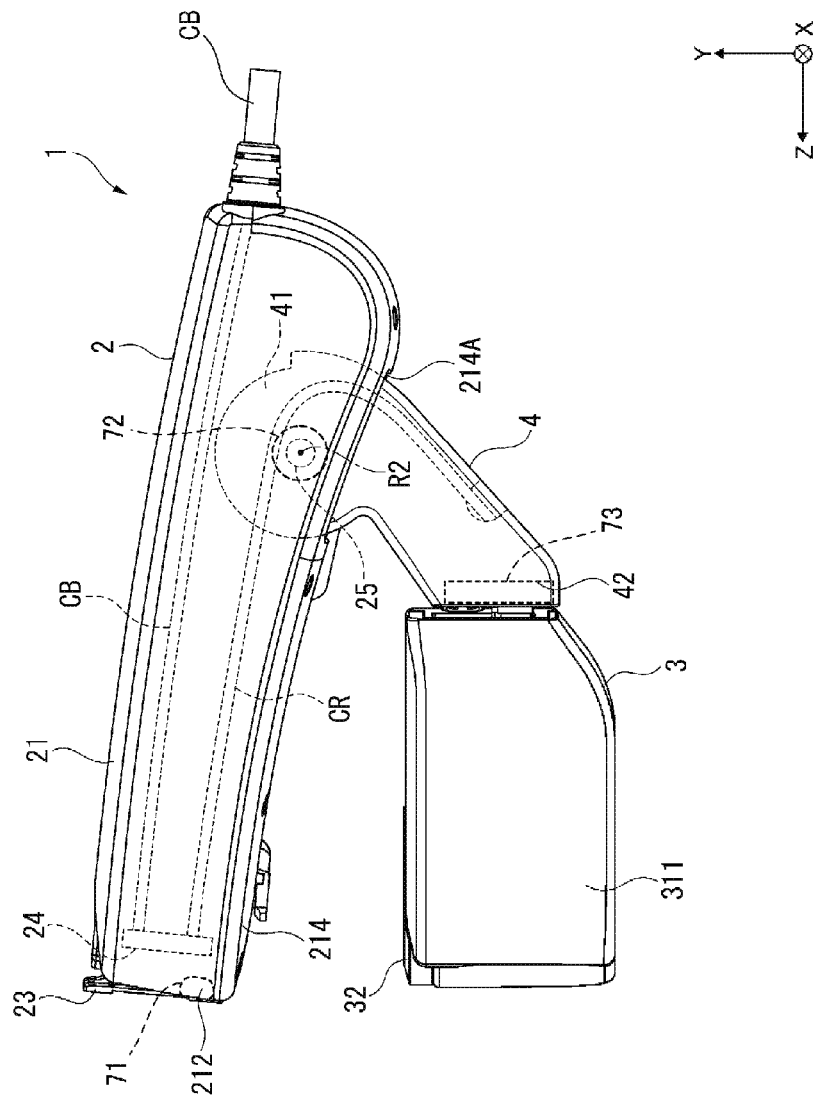
FIG. 5 is a side view showing the virtual image display device in the first embodiment.

FIG. 4 is a plan view of the virtual image display device 1 viewed from the opposite direction of the Y direction. FIG. 5 is a side view of the virtual image display device 1 viewed from the X direction.

As shown in FIG. 4, the main body case 21 is disposed along the forehead of the user US (the user US whose contour is indicated by a dotted line in FIG. 4) and fixed to the head by the band 22. The main body case 21 is a housing that houses the control board 24 (see FIG. 2), the cable CB, and the like on the inside and supports the image pickup section 23 and the arm section 4.

The main body case 21 has an external shape of a substantially semicircular shape (a substantially U shape) conforming to the shapes of the forehead and the temporal regions of the user US. That is, in the main body case 21, an inner surface 211 opposed to the forehead to the temporal regions of the user US is curved along the head of the user US when viewed from the Y-direction side.

As shown in FIG. 5, turning shaft sections 25 that turnably axially support one ends of the respective arm sections 4 are provided near both arcuate ends of the main body case 21. Note that, as explained in detail below, the one ends in the arm sections 4 are disposed on the inside of the main body case 21.

The band 22 fixes the main body case 21 to the head of the user US. The band 22 includes, as shown in FIG. 4, a band main body 221 attached to the inner surface 211 of the main body case 21 and band sections 222 attached to the band main body 221.

As shown in FIGS. 3 and 4, the band main body 221 includes, at both ends, annular sections 221A to which the band sections 222 are attached.

As shown in FIG. 4, the band sections 222 are attached to the annular sections 221A at both the ends of the band main body 221 to configure the annular band 22 in conjunction with the band main body 221. The band sections 222 are formed of, for example, a belt-like member having flexibility. The belt sections 222 press a wearing target such as the head of the user US or the helmet toward the band main body 221 side, whereby the band 22 and the headband section 2 are fixed to the head of the user US.

As shown in FIGS. 2 and 4, the image pickup section 23 is disposed substantially in the center on an outer surface 212 located on the opposite side of the inner surface 211 in the main body case 21. The image pickup section 23 picks up an image of a part of a region in the front of the user US, that is, in the visual field of the user US. The image pickup section 23 includes, as shown in FIG. 2, the stereo camera 231, an illuminance sensor 232 that detects the illuminance of external light, an LED 233, and a module housing 234 that houses the stereo camera 231, the illuminance sensor 232, and the LED 233 on the inside. Note that the LED 233 functions as a power indicator that is lit during driving of the virtual image display device 1 and extinguished during non-driving of the virtual image display device 1.

As shown in FIG. 2, the module housing 234 includes, on a surface on the Z-direction side, a window section 235 covered by a light transmitting member. The stereo camera 231 picks up an image of the outside via the window 235. The illuminance sensor 232 detects the illuminance of external light made incident via the window section 235.

On a side surface 234A crossing the X direction of the module housing 234, a turning shaft section 236 projecting along the X direction from the side surface 234A is provided. Specifically, the turning shaft section 236 is protrudingly provided in a position on the opposite side of the Y direction on the side surface 234A. The turning shaft section 236 is supported by a bearing section (not shown in the figure) provided in a recessed section 213 of the main body case 21 in which the module housing 234 is disposed. An adjusting mechanism according to the invention is configured by the turning shaft section 236, the bearing section, and the like. Note that, in FIG. 2, only the turning shaft section 236 on the proximal end side in the X direction of the two side surfaces 234A is shown. However, a turning shaft section is also provided in a corresponding position on a side surface on the distal end side in the X direction.

The module housing 234 is capable of turning within a predetermined range about a turning shaft R1 parallel to the X direction defined by the turning shaft section 236. Therefore, it is possible to adjust an image pickup direction of the stereo camera 231 (i.e., an image pickup direction of image pickup by the image pickup section 23) by adjusting a posture of the module housing 234 with respect to the main body case 21.

As shown in FIG. 2 and FIG. 5 referred to below, a motion control section 71 is provided in the turning shaft section 236. The motion control section 71 has a function of detection or driving concerning the turning of the image pickup section 23 about the turning shaft section 236. Details of the motion control section 71 are explained below.

Configuration of the Display Section

The display section 3 forms an image corresponding to image information input thereto and causes the user US to visually recognize the image as a virtual image. The display section 3 includes a pair of optical devices 31 respectively disposed with respect to the right eye and the left eye of the user US (the optical devices for left eye and right eye are respectively represented as 31L and 31R) and a substantially U-shaped frame section 32 that holds the pair of optical devices 31. The optical device for left eye 31L of the pair of optical devices 31 includes a light guide member 313L including a half mirror. The optical device for right eye 31R of the pair of optical devices 31 includes a light guide member 313R including a half mirror. Note that the optical device for left eye 31L and the optical device for right eye 31R have a mirror symmetrical relation each other.

Figure 6:
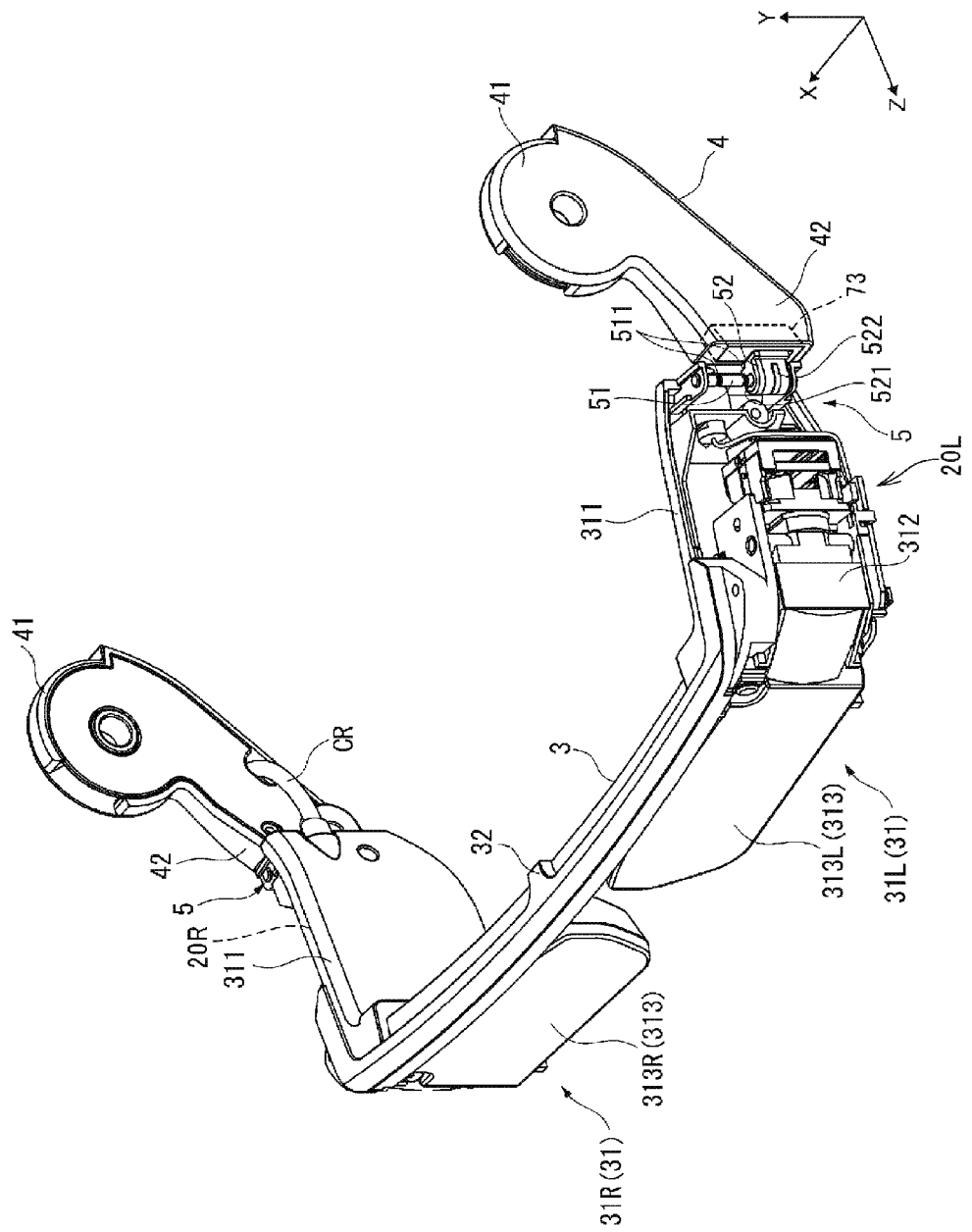
FIG. 6 is a perspective view showing arm sections and a display section in the first embodiment.

FIG. 6 is a diagram showing the inside of the optical device 31 excluding a part of the cover member 311.

The pair of optical devices 31 respectively includes cover members 311, optical units 312 (see FIG. 6), and the light guide members 313 (see FIG. 3).

The cover members 311 are housings that house the optical units 312 on the insides.

The optical units 312 are disposed on the insides of the cover members 311. The optical units 312 emit image lights generated by image generating sections 20 explained below to the light guide members 313 corresponding to the optical units 312.

The light guide members 313 (the light guide members for right eye and left eye are respectively represented as 313R and 313L) are disposed in positions corresponding to the eyes of the user US. Transreflective layers (semi-reflective layers) having a form of a half mirror are formed on the insides of the light guide members 313. An outside world can be observed via the transreflective layers. Besides, image lights emitted from the optical units 312 and reflected on the transreflective layers are made incident on the eyes, whereby a virtual image is visually recognized. The light guide members 313 are mainly formed of resin (e.g., cycloolefin polymer) indicating light transmissivity in a visible light region.

In the optical devices 31R and 31L, image generating sections 20R and 20L that deliver image lights to the optical units 312 are respectively disposed. Cables CR for outputting image information (image signals) are connected to the image generating sections 20R and 20L. As shown in FIGS. 3 and 6, the cables CR are extended to the outside of the cover members 311. Thereafter, as shown in FIG. 5, the cables CR are inserted into the arm sections 4. As explained below with reference to FIG. 10, the image generating sections 20 (the image generating sections 20R and 20L) include backlights functioning as light sources that emit lights according to control by the control device 300 (FIG. 1) and LCDs that generate image lights on the basis of image signals output by the control device 300. The image lights generated by the image generating sections 20 are made incident on the optical units 312 and radiated on the eyeballs of the user US from the optical units 312 through the light guide members 313.

The frame section 32 holds the pair of optical devices 31 on the distal end side in the Y direction. The optical device for left eye 31L is fixed to the proximal end side in the X direction of the frame section 32. The optical device for right eye 31R is fixed to the distal end side in the X direction.

Configuration of the Arm Sections

As shown in FIGS. 2 and 3, the pair of arm sections 4 connects the main body case 21 of the headband section 2 and the cover members 311 of the display section 3. The pair of arm sections 4 is configured to be capable of turning with respect to the main body case 21. As shown in FIG. 5, end portions on the main body case 21 side in the arm sections 4 are turnably supported in the main body case 21 via openings 214A formed on a lower surface 214 (a surface 214 on the opposite side of the Y direction) of the main body case 21. The arm sections 4 respectively include first end portions 41 and second end portions 42.

The first end portions 41 are end portions on the opposite side of the Z direction in the arm sections 4. When viewed from the X-direction side, the first end portions 41 are formed in a substantially circular shape. The first end portions 41 are inserted through the openings 214A and axially supported by the turning shaft sections 25 in the main body case 21. Therefore, the arm sections 4 are capable of turning within predetermined ranges centering on turning shafts R2 that pass axial supporting positions of the first end portions 41 and are parallel to the X direction.

The second end portions 42 are end portions on the Z-direction side in the arm sections 4. Slide members 52 configuring the moving mechanisms 5 explained below are provided at the second end portions 42. The slide members 52 engage with guiderails 51 configuring the moving mechanisms 5 and disposed in the cover members 311 of the display section 3. Consequently, the second end portions 42 and the display section 3 are connected.

Figure 7:
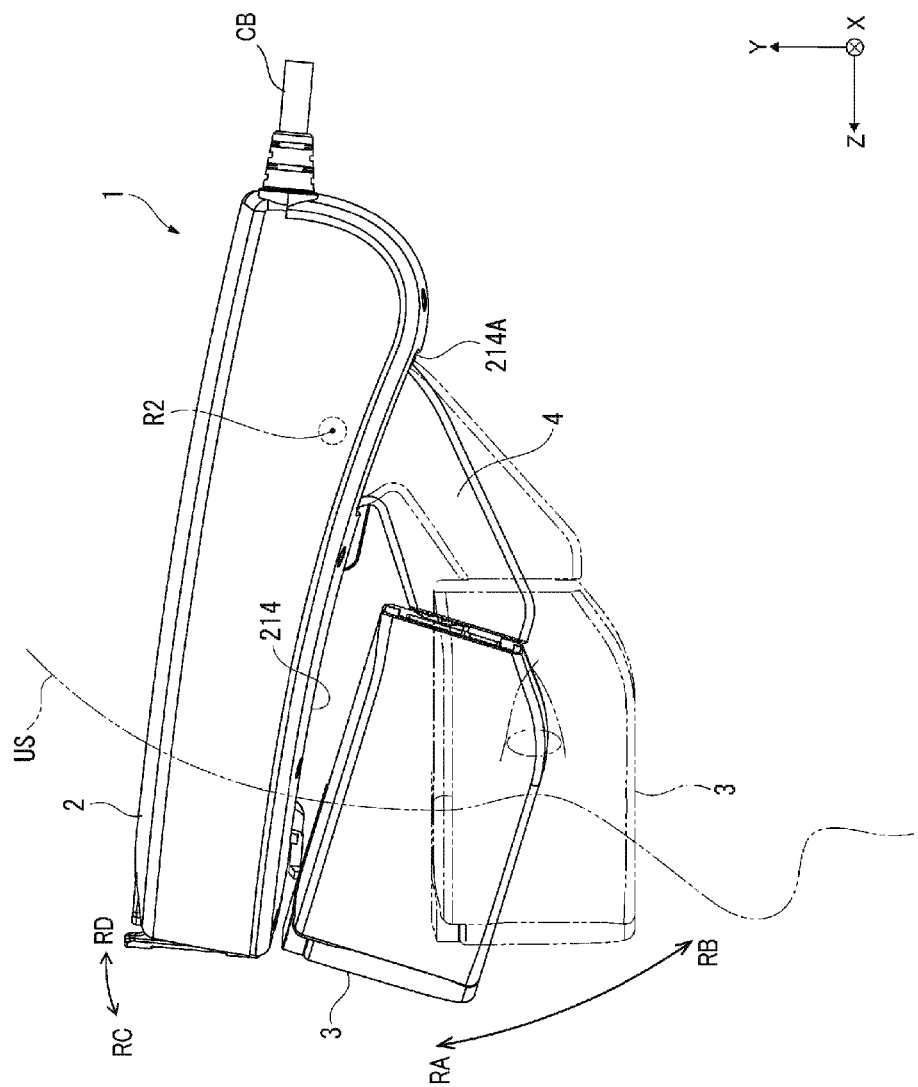
FIG. 7 is a side view showing the virtual image display device in the first embodiment.

FIG. 7 is a diagram showing a state in which the display section 3 and the arm section 4 turn. In FIG. 7, the arm section 4 is turned clockwise about the turning shaft R2 parallel to the X axis, that is, substantially orthogonal to a viewing direction from the state shown in FIG. 5.

In this embodiment, as shown in FIG. 7, the arm section 4 is capable of turning about the turning shaft R2 in a direction indicated by an arrow RA in the figure to the headband section 2 side until the display section 3 or the arm section 4 comes into contact with the headband section 2. On the other hand, the arm section 4 is capable of turning in the opposite direction of the direction explained above, that is, a direction indicated by an arrow RB in the figure until an end portion on the opposite side of the Z direction of the opening 214A and the arm section 4 come into contact with each other.

By turning the arm section 4 in this way, it is possible to adjust the position and the angle of the display section 3. As shown in FIG. 7, it is possible to move the display section 3 to a position where it is hard to visually recognize a virtual image, that is, a position where it is easy to observe an outside world (the periphery of the user US). For example, when the user US does not have to visually recognize an image displayed on the display section 3, by turning the arm section 4 and moving the display section 3 in the RA direction, it is possible to retract the display section 3 from the visual field of the user US.

The virtual image display device 1 has a configuration in which the headband section 2 and the display section 3 are separated and coupled by the arm sections 4. A burden on the user US due to the load of the virtual image display device 1 is reduced by this configuration. That is, the virtual image display device 1 is worn on the head of the user US by the headband section 2. Therefore, the user US only has to support the load of the virtual image display device 1 in the head and does not have to receive the load in the nose and the ears. Therefore, a sense of burden is light. Despite such a configuration, the virtual image display device 1 can locate the display section 3 in front of the eyes of the user US and perform AR (Augmented Reality) display explained below. The headband section 2 does not need to be set in direct contact with the head of the user US. For example, the user US can wear the virtual image display device 1 over a protective cap.

As shown in FIG. 5, a motion control section 72 is provided in the turning shaft section 25. The motion control section 72 has a function of detection or driving concerning the turning of the arm section 4 about the turning shaft section 25, that is, the turning shaft R2. Details of the motion control section 72 will be described later.

Note that the cable CR (see FIG. 6) inserted into the arm section 4 from the display section 3 intrudes into the main body case 21 from the first end portion 41 through the arm section 4 as shown in FIG. 5. As shown in FIGS. 1 to 7, the cable CR extends to the outside from one end (an end portion on the opposite side of the X direction) of the main body case 21 together with the cable CB extending from the control board 24 in the main body case 21.

Configuration of the Moving Mechanisms

The moving mechanisms 5 connect the display section 3 and the arm sections 4. The moving mechanisms 5 are configured to be capable of moving the display section 3 with respect to the arm sections 4 in directions in which the display section 3 moves close to and away from the headband section 2 (i.e., the Y direction and the opposite direction of the Y direction). The moving mechanisms 5 include, as shown in FIG. 6, two sets of guiderails 51 and slide members 52.

The guiderails 51 guide movement in the Y direction and the opposite direction of the Y direction of the slide members 52 provided at the second end portions 42. The guiderails 51 are fixed on the insides of the respective cover members 311. The guiderails 51 are columnar members. When a traveling direction of image lights traveling from the light guide members 313 toward the eyes of the user US is parallel to the Z direction, the guiderails 51 are disposed such that the axial direction thereof extends along the Y direction. On the outer circumferential surfaces of the guiderails 51, grooves 511 extending along the circumferential direction for determining stop positions of the slide members 52 are formed in a plurality of positions along the axial direction to make it possible to move the slide members 52 stepwise along the guiderails 51 and generate a sense of click during a slide of the slide members 52.

Figure 8:
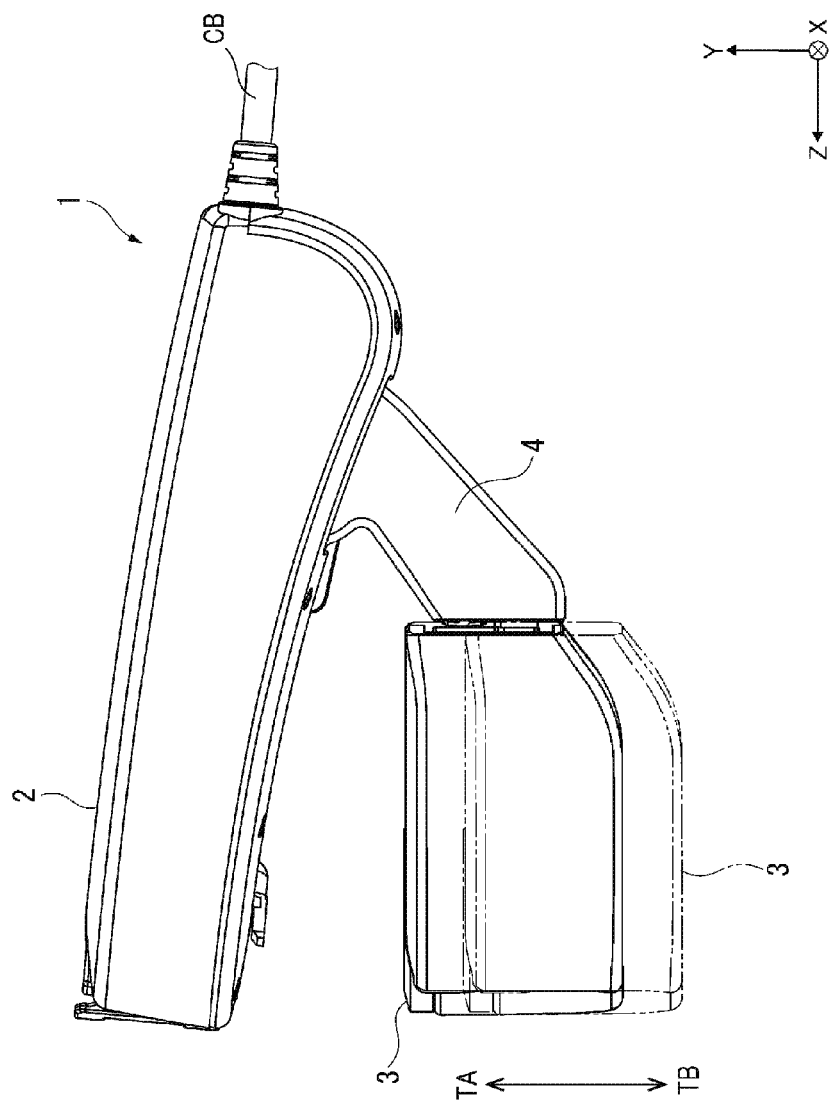
FIG. 8 is a side view showing the virtual image display device in the first embodiment.

FIG. 8 is a diagram showing a state in which the display section 3 is moved by the moving mechanism 5. Note that, in FIG. 8, a state is shown in which the arm section 4 is positioned such that a moving direction by the moving mechanism 5 is along the Y direction.

As explained above, the slide members 52 are protrudingly provided from surfaces on the Z-direction side at the second end portions 42 of the arm sections 4. The slide members 52 are engaged slidably along the axial direction of the guiderails 51. Consequently, as shown in FIG. 8, the display section 3 is moved in the Y direction. The distance between the headband section 2 and the display section 3 can be adjusted. That is, the display section 3 can be moved to rise along the Y direction as indicated by an arrow TA and fall along the Y direction as indicated by an arrow TB.

In this way, the display section 3 is supported slidably up and down. Consequently, the user US can freely adjust the position of a display image of the display section 3 according to, for example, a situation of work. For example, when work support is performed by AR display, the user US only has to lower the display section 3 in the TB direction when performing work while looking at the hands and lift the display section 3 in the TA direction during work for an upper part such as a shelf. In this case, it is possible to slide the display section 3 and change the position of the display section 3 to allow the user US to easily look at the outside (the hands or the upward direction) for the work. Concerning a direction in which the display direction 3 is moved, ideally, it is desirable to turn the display section 3 around an axis passing the rotation center of the eyeball of the user US. However, the display section 3 can be slid up and down (in the TA and TB directions) near the eyes instead of ideally turning the display section 3.

As explained above, the display section 3 can be turned about the turning shaft R2 of the first end portion 41. The turning about the turning shaft R2 is useful as a motion for retraction for retracting the display section 3 from the visual filed of the user US. However, since the distance between the display section 3 and the eyeball of the user US changes according to the turning, if the display section 3 is moved around the turning shaft R2, it may be hard to see the display section 3 even if a movement amount is small. On the other hand, a motion for sliding the display section 3 up and down using the moving mechanism 5 or a motion for turning the display section about the axis passing the rotation center of the eyeball displace the display section 3 while keeping the distance between the display section 3 and the eyes constant. Therefore, visibility is satisfactorily maintained. In other words, the motion for sliding the display section 3 up and down or turning the display section 3 about the axis passing the rotation center of the eyeball is unsuitable for the purpose of retracting the display section 3 from the visual field.

The virtual image display device 1 includes both of a mechanism for turning the display section 3 about the turning shaft R2 and a mechanism for sliding the display section 3 up and down with the moving mechanism 5. Therefore, it is possible to retract the display section 3 from the visual field of the user US and change or adjust a position for viewing display of the display section 3.

In the headband section 2, an image pickup direction of the stereo camera 231 can be moved by turning the image pickup section 23 about the turning shaft R1 in a direction indicated by an arrow RC in FIG. 7 and the opposite direction (an arrow RD) of the direction. Consequently, it is possible to adjust an image pickup range of the stereo camera 231 up and down.

In the virtual image display device 1, the headband section 2 and the display section 3 are coupled to be capable of turning in the RA and RB directions and sliding in the TA and TB directions via the arm sections 4. Consequently, relative positions of an image pickup range of the image pickup section 23 and the position of the display section 3, or the positional or spatial relationship therebetween, changes. This configuration is advantageous in that the display section 3 can be reduced in weight by providing the image pickup section 23 in the headband section 2. By reducing the display section 3 in weight, it is possible to make a structure for supporting the display section 3, for example, a supporting structure for the moving mechanisms 5 and the first end portions 41 simple and light in weight. There is also an advantage in that the user US can move the display section 3 with weak force according to an intention of the user US. The image pickup range of the image pickup section 23 overlaps at least a range visually recognized through the display section 3. The image pickup range of the image pickup section 23 may include the range visually recognized through the display section 3.

Note that the slide member 52 includes, as shown in FIG. 6, a hole section 521 through which the guiderail 51 is inserted, a slit 522 formed to traverse the hole section 521 in an intermediate position in the Y direction, and a not-shown O-ring formed of an elastic body such as Anan rubber. The O-ring is disposed in the slit 522. The guiderail 51 is inserted through the O-ring. The O-ring tightens the guiderail 51 in the inner diameter direction, whereby it is possible to slide the sliding member 52 along the guiderail 51 while giving moderate resistance to the sliding member 52. Then, the O-ring fits in the groove 511 of the guiderail 51, whereby relative positions of the slide member 52 and the guiderail 51 are maintained. However, the configuration of the moving mechanism 5 is not limited to this. The slide member 52 may be capable of continuously relatively moving along the height direction of the guiderail 51. In this case, the groove 511 does not have to be provided.

As shown in FIGS. 5 and 6, a motion control section 73 is provided in the moving mechanism 5. The motion control section 73 has a function of detection or driving concerning a slide motion in the moving mechanism 5. Specifically, the motion control section 73 performs, concerning a motion of the slide member 52 sliding along the guiderail 51, detection of at least one of a slide amount and a slide direction, application of a driving force to the slide, or the like. Details of the motion control section 73 are explained below.

The virtual image display device 1 configured as explained above has advantages explained below.

The headband section 2 functioning as the main body section extending along the head of the user US is fixed in a position where a virtual image displayed by the display section 3 connected to the headband section 2 via the arm section 4 can be visually recognized by the user US. Consequently, since the headband section 2 is fixed to a fixed part such as the forehead of the user US in a state in which the headband section 2 is disposed along the forehead, it is possible to suppress the load of the virtual image display device 1 from being applied to the nose of the user US. Therefore, it is possible to reduce a burden on the user US during use of the virtual image display device 1 and improve a sense of use.

The arm section 4 is capable of turning about a connecting part to the headband section 2. Therefore, it is possible to adjust the position and the angle of the display section 3 with respect to the headband section 2 by turning the arm section 4. Consequently, it is possible to locate the display section 3 in a position corresponding to a visual line direction of the user US during the wearing of the virtual image display device 1 and improve visibility of a virtual image displayed by the display section 3. When the virtual image is not needed to be visually recognized, it is possible to retract the display section 3 from the front of the eyes of the user US. Therefore, it is possible to improve convenience of the virtual image display device 1.

The arm section 4 is connected to the headband section 2 to be capable of turning about the turning shaft R2. Consequently, it is possible to easily adjust the position of the display section 3 according to turning operation for the arm section 4. Besides, when the virtual image is not needed to be visually recognized, it is possible to surely retract the display section 3 from the front of the eyes of the user US. Therefore, it is possible to surely improve the convenience of the virtual image display device 1.

The moving mechanism 5 moves the display section 3 in directions in which the display section 3 moves close to and away from the headband section 2. Consequently, it is possible to make it easy to adjust the position of the display section 3 to overlap a viewing direction according to the positions of the eyes of the user US. Therefore, it is possible to adjust the position of the display section 3 according to the user US and improve the convenience and versatility of the virtual image display device 1.

It is possible to pick up an image of a part of a region in the visual field of the user US with the image pickup section 23 included in the headband section 2. Therefore, for example, by displaying a picked-up image picked up by the image pickup section 23 on the display section 3 or outputting the picked-up image to the outside, the user US or others can grasp a situation around the user US.

When the image pickup section 23 is located in the display section 3, it is conceivable that a weight balance of the virtual image display device 1 may lost because of the load of the image pickup section 23. On the other hand, since the image pickup section 23 is located in the headband section 2 fixed to the fixed part, it is possible to reduce the weight of the display section 3 and easily make the weight balance of the virtual image display device 1 appropriate. Therefore, it is possible to further reduce the burden on the user US.

The image pickup section 23 is configured to be capable of turning about the turning shaft R2. Consequently, it is possible to adjust an image pickup direction of the image pickup section 23 to a position corresponding to a visual line direction of the user US. Therefore, it is possible to surely pick up an image of a part of a region in a visual field of the user US by the image pickup section.

The control board 24 that controls at least a part of functions of the virtual image display device 1 is disposed in the headband section 2. Consequently, as in the image pickup section 23, compared with when the control board 24 is provided in the display section 3, it is possible to reduce the weight of the display section 3 and easily make the weigh balance of the virtual image display device 1 appropriate. Therefore, it is possible to further reduce the burden on the user US.

When a cable is directly extended to the outside from the display section 3, it is necessary to increase, taking into account movement of the cable, the strength of the cover member 311 and the frame section 32 functioning as the housing configuring the exterior of the display section 3. If the cable extends to the outside from the display section 3, appearance may be deteriorated.

On the other hand, the cable CR extending from the display section 3 is connected to the control board 24 through the arm section 4 and the headband section 2. The cable CB extending from the control board 24 extends to the outside through the headband section 2. Consequently, it is unnecessary to increase the strength of the cover member 311, the frame section 32, and the like. Besides, it is possible to improve the appearance of the virtual image display device 1.

The headband section 2 has an arcuate external shape conforming to the shape of the head of the user US. Consequently, it is possible to more surely dispose the headband section 2 along the head. Therefore, it is possible to improve a wearing feeling. Besides, it is possible to improve the appearance during the wearing of the virtual image display device 1.

With the optical device for left eye 31L and the optical device for right eye 31R, the display section 3 can cause the user US to visually recognize the same virtual image with the left eye and the right eye of the user US and cause the user US to visually recognize different images respectively with the left eye and the right eye. Therefore, it is possible to improve the convenience and the versatility of the virtual image display device 1.

The virtual image display device 1 adopts a see-through type configuration including the light guide members 313 that guide lights for forming a virtual image to the eyes of the user US and transmit external light. Consequently, it is possible to observe the virtual image and the periphery of the user US via the light guide members 313. Therefore, it is possible to give a sense of security to the user US during the visual recognition of the virtual image. Besides, it is possible to realize augmented reality by causing the user US to visually recognize the virtual image superimposed on a scene around the user US. Therefore, it is possible to further improve the convenience and the versatility of the virtual image display device 1.

Figure 9:
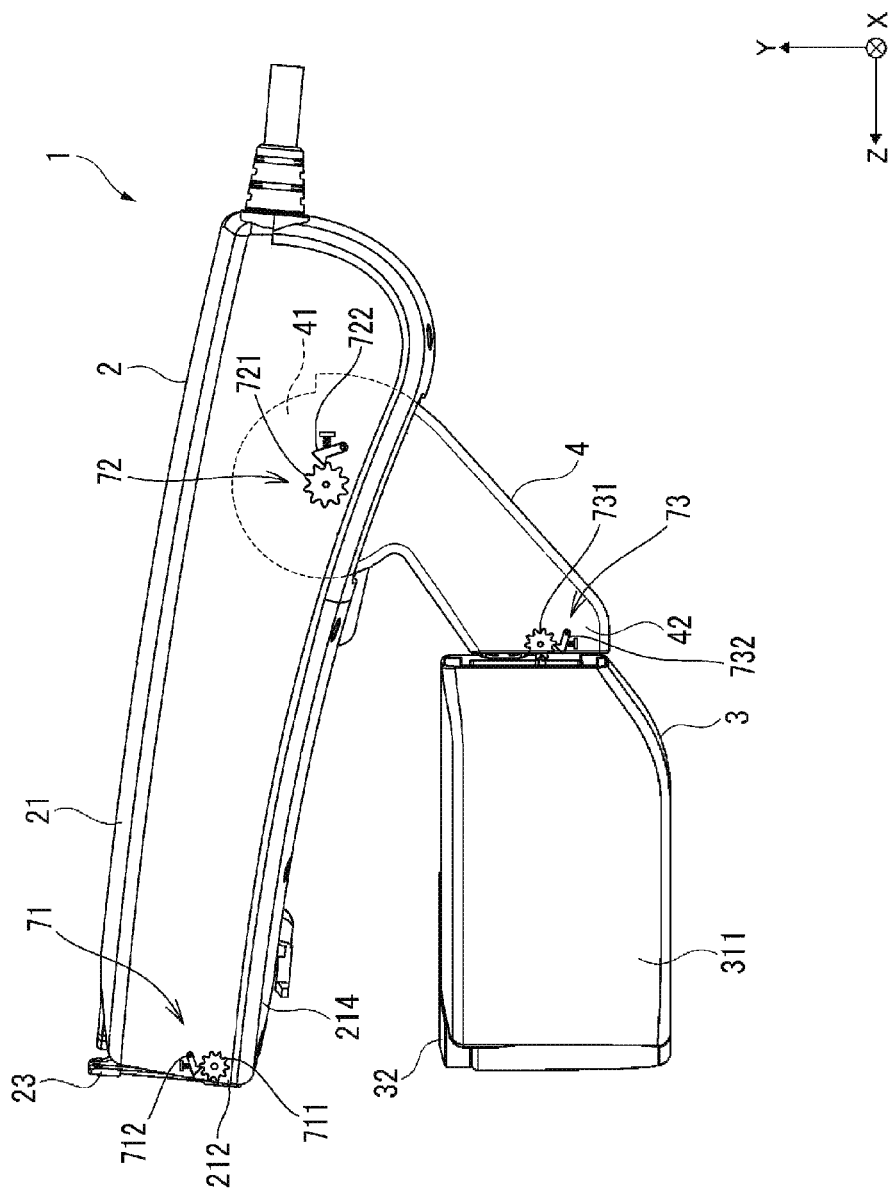
FIG. 9 is a side view showing the configurations of the virtual image display device and a motion control section in the first embodiment.

FIG. 9 is an explanatory diagram showing the configuration of the motion control sections 71, 72, and 73 in the first embodiment. FIG. 9 shows a side view of the virtual image display device 1.

The motion control section 71 in this embodiment functions as a sensor that detects a turning motion of the image pickup section 23 and a rotation regulating section. More specifically, the motion control section 71 includes a gear 711 that rotates when the image pickup section 23 turns around the turning shaft R and a step detecting section 712 that detects a rotation amount and a rotating direction of the gear 711. The gear 711 is fixed to, for example, the image pickup section 23 and turns together with the image pickup section 23. The step detecting section 712 is fixed to the headband section 2 side, for example, in the vicinity of the turning shaft section 236. The step detecting section 712 includes a lever that is urged to come into contact with teeth of the gear 711 by an urging member such as a spring. The lever hits the teeth of the gear 711 and swings when the gear 711 rotates. The step detecting section 712 detects the swing of the lever with, for example, a mechanical switch or an electric sensor and outputs a detection pulse indicating the swing of the lever.

The motion control section 71 functions as a rotation regulating section according to fitting of the gear 711 and the lever of the step detecting section 712. The lever of the step detecting section 712 applies a regulating force to the rotation of the gear 711. When force exceeding the regulating force is applied, the teeth of the gear 711 push the lever aside and the gear 711 rotates. Therefore, the rotation of the gear 711 is limited every time the teeth of the gear 711 hit the lever of the step detecting section 712. Therefore, the motion for turning the image pickup section 23 is a stepwise motion. This step is equivalent to an interval of the teeth of the gear 711.

Note that, in the motion control section 71, an output circuit may be provided that generates data of a motion of the motion control section 71 on the basis of the detection pulse of the step detecting section 712 and outputs the data. In this case, the motion control section 71 can output data of a turning amount and a turning direction of the image pickup section 23 to a control section 140 (FIG. 10) explained below.

The motion control section 72 in this embodiment functions as a sensor that detects a motion of the arm section 4 turning about the turning shaft R2. More specifically, the motion control section 72 includes a gear 721 that rotates according to the turning of the arm section 4 and a step detecting section 722 that detects a rotation amount and a rotating direction of the gear 721. The gear 721 is fixed to, for example, the first end portion 41 and turns together with the arm section 4. The step detecting section 722 is fixed to, for example, the turning shaft section 25. The step detecting section 722 includes a lever urged to come into contact with teeth of the gear 721 by an urging member such as a spring. The lever hits the teeth of the gear 721 and swings when the gear 721 rotates. The step detecting section 722 detects the swing of the lever with, for example, a mechanical switch or an electric sensor and outputs a detection pulse indicating the swing of the lever.

The motion control section 72 functions as a rotation regulating section according to fitting of the gear 721 and the lever of the step detecting section 722. The lever of the step detecting section 722 applies a regulating force to the rotation of the gear 721. When force exceeding the regulating force is applied, the teeth of the gear 721 push the lever aside and the gear 721 rotates. Therefore, the rotation of the gear 721 is limited every time the teeth of the gear 721 hit the lever of the step detecting section 722. Therefore, the motion for turning the arm section 4 in the turning shaft section 25 is a stepwise motion. This step is equivalent to an interval of the teeth of the gear 721.

Note that, in the motion control section 72, an output circuit may be provided that generates data of a motion of the motion control section 72 on the basis of the detection pulse of the step detecting section 722 and outputs the data. In this case, the motion control section 72 can output data of a turning amount and a turning direction of the arm section 4 to the control section 140 (FIG. 10) explained below from the motion control section 72.

The motion control section 73 in this embodiment functions as a sensor that detects a slide motion in the moving mechanism 5. More specifically, the motion control section 73 includes a gear 731 that rotates when the slide member 52 moves up and down along the guiderail 51 and a step detecting section 732 that detects a rotation amount and a rotating direction of the gear 731. The gear 731 is turnably held by, for example, the second end portion 42, meshes with a rack (not shown in the figure) provided on the slide member 52 side, and rotates according to an up-down motion of the slide member 52. The step detecting section 732 includes a lever urged to come into contact with teeth of the gear 731 by an urging member such as a spring. The lever hits the teeth of the gear 731 and swings when the gear 731 rotates. The step detecting section 732 detects the swing of the lever with, for example, a mechanical switch or an electric sensor and outputs a detection pulse indicating the swing of the lever.

The motion control section 73 functions as a rotation regulating section according to fitting of the gear 731 and the lever of the step detecting section 732. The lever of the step detecting section 732 applies a regulating force to the rotation of the gear 731. When force exceeding the regulating force is applied, the teeth of the gear 731 push the lever aside and the gear 731 rotates. Therefore, the rotation of the gear 731 is limited every time the teeth of the gear 731 hit the lever of the step detecting section 732. Therefore, the motion for sliding the display section 3 in the moving mechanism 5 is a stepwise motion. This step is equivalent to an interval of the teeth of the gear 731.

Note that, in the motion control section 73, an output circuit may be provided that generates data of a motion of the motion control section 73 on the basis of the detection pulse of the step detecting section 732 and outputs the data. In this case, the motion control section 73 can output data of a slide amount in the moving mechanism 5 and a slide direction of the display section 3 to the control section 140 (FIG. 10) explained below.

Configuration of a Control System

FIG. 10 is a functional block diagram of sections configuring the HMD 100.

As shown in FIG. 10, the HMD 100 is configured to be capable of being connected to an external apparatus OA via an interface 125. The interface 125 connects various external apparatuses OA, which function as supply sources of contents, to the control device 300. As the interface 125, for example, interfaces adapted to wired connection such as an USB interface, a micro USB interface, and an interface for a memory card can be used.

The external apparatus OA is used as an image supply device that supplies an image to the HMD 100. As the external apparatus OA, for example, a personal computer (PC), a cellular phone terminal, or a game terminal is used.

The control device 300 includes the control section 140, an operation section 111, an input-information acquiring section 110, a storing section 120, and a transmitting section (Tx) 131 and a transmitting section (Tx) 132. The control device 300 transmits various signals to receiving sections 133 and 134 included in the image generating section 20 provided in the display section 3.

The operation section 111 detects operation by the user US. The operation section 111 includes a power switch 301, a track pad 302, a key switch section 303, and an up-down key 305 shown in FIG. 1. The input-information acquiring section 110 acquires an operation signal or operation data output by the operation section 111 according to an operation input by the user US.

The control device 300 includes a power supply section 130 and supplies electric power to the sections of the control device 300 and the virtual image display device 1.

The storing section 120 is a nonvolatile storage device and has stored therein various computer programs. In the storing section 120, image data to be displayed on the virtual image display device 1 of the HMD 100 may be stored. The control section 140 may executes a computer program stored in the storing section 120 to thereby generate display data displayed by the virtual image display device 1.

A three-axis sensor 113, a GPS 115, and a communication section 117 are connected to the control section 140. The three-axis sensor 113 is a three-axis acceleration sensor. The control section 140 is capable of acquiring a detection value of the three-axis sensor 113. The GPS 115 includes an antenna (not shown in the figure), receives a GPS (Global Positioning System) signal, and calculates the present position of the control device 300. The GPS 115 outputs the present position and the present time calculated on the basis of the GPS signal to the control section 140. The GPS 115 may include a function of acquiring the present time on the basis of information included in the GPS signal and correcting time clocked by the control section 140 of the control device 300.

The communication section 117 executes wireless data communication conforming to a standard of wireless communication such as a wireless LAN (WiFi (registered trademark)) or a Miracast (registered trademark). The communication section 117 is also capable of executing wireless data communication conforming to a standard of short-range wireless communication such as Bluetooth (registered trademark), Bluetooth Low Energy, RFID, or Felica (registered trademark).

When the external apparatus OA is connected to the communication section 117 by radio, the control section 140 acquires content data with the communication section 117 and performs control for displaying an image on the virtual image display device 1. On the other hand, when the external apparatus OA is connected to the interface 125 by wire, the control section 140 acquires content data from the interface 125 and performs control for displaying an image on the virtual image display device 1. Therefore, the communication section 117 and the interface 125 are hereinafter collectively referred to as data acquiring section. The data acquiring section acquires content data from the external apparatus OA. The content data may be stored in, for example, the storing section 120.

The control section 140 includes a CPU, a ROM, and a RAM (all of which are not shown in the figure). The control section 140 reads out and executes a computer program stored in the storing section 120 or the ROM to thereby control the sections of the HMD 100. The control section 140 executes the computer program to function as an operating system (OS) 150, an image processing section 160, a display control section 170, an image-pickup control section 181, a position-detection control section 182, an AR-display control section 183, and the sound processing section 187.

The image processing section 160 acquires an image signal included in contents. The image processing section 160 transmits, with the transmitting section 131, synchronization signals such as a vertical synchronization signal VSync and a horizontal synchronization signal HSync, a clock signal PCLK, and digital image data (in the figure, Data) for displaying an image included in the contents to each of the image generating sections 20R and 20L. The image processing section 160 may execute, according to necessity, image processing such as resolution conversion processing, various color tone correction processing such as adjustment of luminance and chroma, and keystone correction processing on image data. The transmitting sections 131 and 132 function as a transceiver for serial transmission between the control device 300 and the virtual-image display device 1.

The image generating sections 20R and 20L modulate lights emitted by a right backlight 205 and a left backlight 206 and generate image lights on the basis of signals input from the image processing section 160 via the receiving sections 133 and 134.

The image generating section 20R includes the right backlight 205 including a light source such as an LED and a diffusion plate and a right backlight control section 201 that drives the right backlight 205. The image generating section 20R includes a transmissive right LCD 241 disposed on an optical path of the light emitted by the right backlight 205 and a right LCD control section 203 that drives the right LCD 241.

The image light transmitted through the right LCD 241 is made incident on the optical unit 312. The right LCD 241 is a transmissive liquid crystal panel on which a plurality of pixels are arranged in a matrix shape.

Similarly, the image generating section 20L includes the left backlight 206 including a light source such as an LED and a diffusion plate and a left backlight control section 202 that controls the left backlight 206. The image generating section 20L includes a transmissive left LCD 242 disposed on an optical path of the light emitted by the left backlight 206 and a left LCD control section 204 that drives the left LCD 242.

The image light transmitted through the left LCD 242 is made incident on the optical unit 312. The left LCD 242 is a transmissive liquid crystal panel on which a plurality of pixels are arranged in a matrix shape.

The display control section 170 transmits control signals to the image generating sections 20R and 20L included in the virtual image display device 1. The display control section 170 transmits control signals to the right backlight control section 201 and the left backlight control section 202 that control lighting of the right backlight 205 and the left backlight 206 included in the image generating sections 20R and 20L.

The right backlight control section 201 and the left backlight control section 202 perform control of lighting and extinction and control of light emission luminance on the respective right backlight 205 and left backlight 206 according to the control signals received from the display control section 170. The right backlight 205 and the left backlight 206 are light emitting bodies such as LEDs or electroluminescence (EL) elements and may be configured using laser light sources or lamps.

The image generating sections 20R and 20L respectively switch ON/OFF of driving of the right backlight 205, the left backlight 206, the right LCD 241, and the left LCD 242 according to the control signals received from the display control section 170. Therefore, lighting and extinction of the backlights and display of an image in the image generating section 20 are controlled according to the control by the display control section 170.

The sound processing section 187 acquires sound signals included in the contents, amplifies the acquired sound signals, and outputs the amplified sound signals to the right earphone 33 and the left earphone 34 through the audio cable CO.

The sound processing section 187 converts sound collected by the microphone 63 into digital data. The sound processing section 187 extracts characteristics from the digital sound data and models the characteristics to thereby execute, for example, talker recognition processing and sound recognition processing. In the talker recognition processing, the sound processing section 187 detects human voice from the sound collected by the microphone 63, identifies the detected human voice for each person, and specifies a talking human for each kind of voice. In the sound recognition processing, the sound processing section 187 performs, for example, text conversion for converting the sound collected by the microphone 63 into a text.

The sections of the virtual image display device 1 are connected to the control section 140 via an interface 28. The interface 28 is configured by the cable CB, a connector for connecting the cable CB, and the like. The interface 28 may be configured to a wireless communication line instead of the cable CB. The interface 28 outputs the clock signal PCLK, the vertical synchronization signal VSync, the horizontal synchronization signal HSync, the image data Data transmitted by the transmitting section 131 to the receiving section (Rx) 133 or 134 corresponding to the transmitting section 131. The interface 28 outputs control signals transmitted by the display control section 170 to the receiving sections 133 and 134.

The interface 28 outputs a pickup image of the stereo camera 231 to the control section 140 and outputs a driving signal for the LED 233 delivered by the control section 140 to the LED 233. Consequently, the LED 233 is lit and extinguished according to control by the control section 140.

The virtual image display device 1 includes a nine-axis sensor 238. The nine-axis sensor 238 is a motion sensor (an inertial sensor) that detects acceleration (three axes), angular velocity (three axes), and terrestrial magnetism (three axes). The nine-axis sensor 238 is connected to the control section 140 via the interface 28. When the virtual image display device 1 is worn on the head of the user US, the control section 140 can detect a movement of the head of the user US on the basis of a detection value of the nine-axis sensor 238. The nine-axis sensor 238 is fixed to the rear surface of the stereo camera 231 by bonding or the like. When the image pickup section 23 turns around the turning shaft R1, the nine-axis sensor 238 turns together with the image pickup section 23.

The receiving sections 133 and 134 function as receivers for serial transmission between the control device 300 and the virtual image display device 1.

The HMD 100 has a function of adjusting, according to a visual line direction of the user US wearing the virtual image display device 1, a display form of an image displayed on the virtual image display device 1. The display section 3 included in the virtual image display device 1 is a see-through type display device with which the user US can visually recognize an outside scene and visually recognizes an image through the light guide members 313. When the user US visually recognizes the outside scene through the display section 3, the HMD 100 displays an image visually recognized over the outside scene. As a form of the display, the HMD 100 displays an image that achieves a so-called AR effect (hereinafter referred to as AR image) for providing information concerning the outside scene, which is a real space. The AR image is displayed such that information concerning a target object present in the real space is displayed over the target object or side by side with the target object. By viewing the AR image, the user US can simultaneously view the target object and various kinds of information concerning the target object. The display of the AR image is more effective when the AR image is displayed according to a position where the target object is seen for the user US.

When performing the AR display, the HMD 100 executes image pickup with the image pickup section 23 and detects an image of the target object from a picked-up image. The HMD 100 specifies the position of the target object in the picked-up image and determines a display position of the AR image on the basis of a correspondence relation between the position in the picked-up image and a position in a display region where the display section 3 displays an image. Alternatively, the HMD 100 estimates a pose and a distance (rotations and translations) of the target object with respect to the image pickup section 23 on the basis of the picked-up image and renders a virtual object on the basis of calibration data 121 explained below such that the user US visually recognizes the virtual object to be superimposed or aligned on the target object. In this embodiment, the rendered virtual object is the AR image.

In this way, when the AR image is displayed, control related to the display position of the image is necessary. Therefore, the control section 140 includes the image-pickup control section 181, the position-detection control section 182, and the AR-display control section 183.

The image-pickup control section 181 controls the image pickup section 23 included in the virtual image display device 1 to execute image pickup and acquires picked-up image data.

The AR-display control section 183 analyzes a picked-up image acquired by a function of the image-pickup control section 181 and detects an image of a target object from the picked-up image. In the HMD 100, data concerning feature values such as a shape and a color is stored in the storing section 120 concerning the detected image of the target object. The AR-display control section 183 detects the image of the target object from the picked-up image using the data stored in the storing section 120 and specifies a position of the image of the target object in the picked-up image. Further, the AR-display control section 183 specifies a position of an image AR1 with respect to a display region of the display section 3, that is, regions where image lights are reflected toward the eyes of the user US in the light guide members 313R and 313L and causes the display control section 170 to display the image AR1. Image data of the image AR1 is content data acquired via the interface 125, content data stored in the storing section 120, image data generated by the AR-display control section 183 through data processing, or the like.

In the HMD 100, initial calibration is executed in order to associate the display position in the display section 3 and the position in the picked-up image of the image pickup section 23. After the user US wears the virtual image display device 1 on the head and adjusts a wearing position of the virtual image display device 1, a fastened state of the band sections 222, and relative positions of the headband section 2 and the eyes of the user US are fixed, the initial calibration is performed to match the positions.

There are various methods for the initial calibration. For example, in this embodiment, steps explained below are executed.

(I) Interocular Distance

The control section 140 causes the two optical devices in the display section 3 to display the same images for calibration. Then, the user US wearing the display section 3 visually recognizes the images for calibration via the left and right eyes. Therefore, the user US gives an instruction to the control section 140 via a user interface (a track pad, etc.) to relatively move at least one of the displayed two images for calibration with respect to the other such that the user US can visually recognize the two images for calibration as coinciding with each other. At timing when the user US visually recognizes the two images for calibration as coinciding with each other, the user US notifies the control section 140 to that effect via the user interface. The control section 140 causes, according to the notification, the image processing section 160 to adjust display positions of images on the optical devices on the basis of the positions of the two images for calibration with respect to the optical devices at the timing. Consequently, calibration of the display section 3 corresponding to the interocular distance can be performed.

(II) Positioning of an AR Object and a Real Object

After the calibration concerning the interocular distance is performed by (I) explained above, the control section 140 fixes and displays an image for calibration (e.g., a virtual 2D marker) in the center of the display section 3. The control section 140 picks up an image of a reference real object corresponding to the image for calibration (e.g., a 2D marker similar to the virtual 2D marker and having known size) via the image pickup section 23 and detects rotations or translations of the reference real object with respect to the image pickup section 23 on the basis of a feature point of the reference real object. The user US moves the head, aligns the image for calibration with the reference real object (matches the position, the size, and the direction of the image for calibration with those of the reference real object), and notifies the control section 140 of timing when the image for calibration is aligned with the reference real object. At this point, the rotations or the translations between the display section 3 and the reference real object is in a default relation. The control section 140 acquires position information in a picked-up image of the reference real object at the timing of the notification and customizes, for the user US, parameters (calibration data 121) for displaying the AR object and the real object one on top of the other. The calibration data 121 includes parameters representing rotations and translations of the image pickup section 23 with respect to the display section 3.

As a result, in the HMD 100, association of the visual field of the user US and the display region of the display section 3 and association of the display region of the display section 3 and the picked-up image of the image pickup section 23 are performed. Therefore, thereafter, the AR-display control section 183 performs the AR display using the picked-up image of the image pickup section 23. That is, by adjusting the display position using the calibration data 121, the position-detection control section 182 can cause the user US to visually recognize the image AR1 according to the position of the target object.

Incidentally, as explained above, the image pickup section 23 is provided in the headband section 2 to be capable of turning about the turning shaft R1. The display section 3 is attached to the headband section 2 via the turning shaft R2 and the moving mechanism 5. Therefore, the image pickup section 23 and the display section 3 are supported by the turning shaft section 236, the turning shaft section 25, and the moving mechanism 5, which are three movable sections, such that the relative positions of the image pickup section 23 and the display section 3, which represent the positional relationship therebetween, change. The turning shaft section 236, the turning shaft section 25, and the moving mechanism 5 correspond to the coupling section according to the invention. These coupling sections function as supporting sections that support one of the image pickup section 23 and the display section 3 on the other.

When displacement in the turning shaft section 236, the turning shaft section 25, and the moving mechanism 5, which are the three movable sections, occurs, relative positions (at least one of relative rotations and translations) between the image pickup section 23 and the display section 3 change. This type of movement occurs, for example, when the user US moves the display section 3 around the turning shaft R2 in order to readjust the view of the display section 3. When the user US moves the display section 3 in the RA direction in order to retract the display section 3 from the visual field and thereafter returns the display section 3 in the RB direction, the display section 3 is not always returned to a position completely the same as the position before the retraction. Further, it is also likely that the user US moves the image pickup section 23 for adjustment of the image pickup range of the image pickup section 23.

When the relative positions of the image pickup section 23 and the display section 3 change according to the movement in the movable sections, the image pickup section 23 and the display section 3 deviate from the positional relationship associated by the initial calibration. Therefore, when the AR display is performed, it is likely that an image for AR (e.g., the image AR1) cannot be displayed in an appropriate display position. In such a case, the display position of the image can be set in the appropriate position by executing the initial calibration again. However, it may be a burden for the user US to suspend work, viewing of a video, or the like performed by using the HMD 100 and perform operation.

Therefore, the HMD 100 detects the relative positions of the image pickup section 23 and the display section 3, or the positional relationship therebetween, using detection results in the motion control sections 71, 72, and 73 and corrects the calibration data 121 to thereby properly maintain the display position of the image in the display section 3. Consequently, it is possible to set the display position of the image of the HMD 100 in an appropriate position with a method simpler in operation than the initial calibration and executable in a shorter time. Therefore, it is possible reduce the burden on the user US.

As shown in FIG. 10, the motion control sections 71, 72, and 73 are respectively connected to the control section 140 via the interface 28. Therefore, the control section 140 can obtain data concerning motions in the respective motion operation sections 71, 72, and 73. For example, the control section 140 may detect the numbers of times of motions of the step detecting sections 712, 722, and 732 as pulses. For example, the control section 140 may receive data output by the motion control section 71, 72, and 73 and detect motion amounts and motion directions in the motion control sections. The control section 140 in this embodiment detects motion states of the motion control sections 71, 72, and 73 with the position-detection control section 182 to thereby detect a turning amount or a turning position of the image pickup section 23 in the turning shaft R1 and a turning amount and a turning position of the first end portion 41 in the turning shaft R2. The position-detection control section 182 detects a slide direction and a slide amount of the display section 3 in the moving mechanism 5 or a position in the moving mechanism 5.

Figure 11:
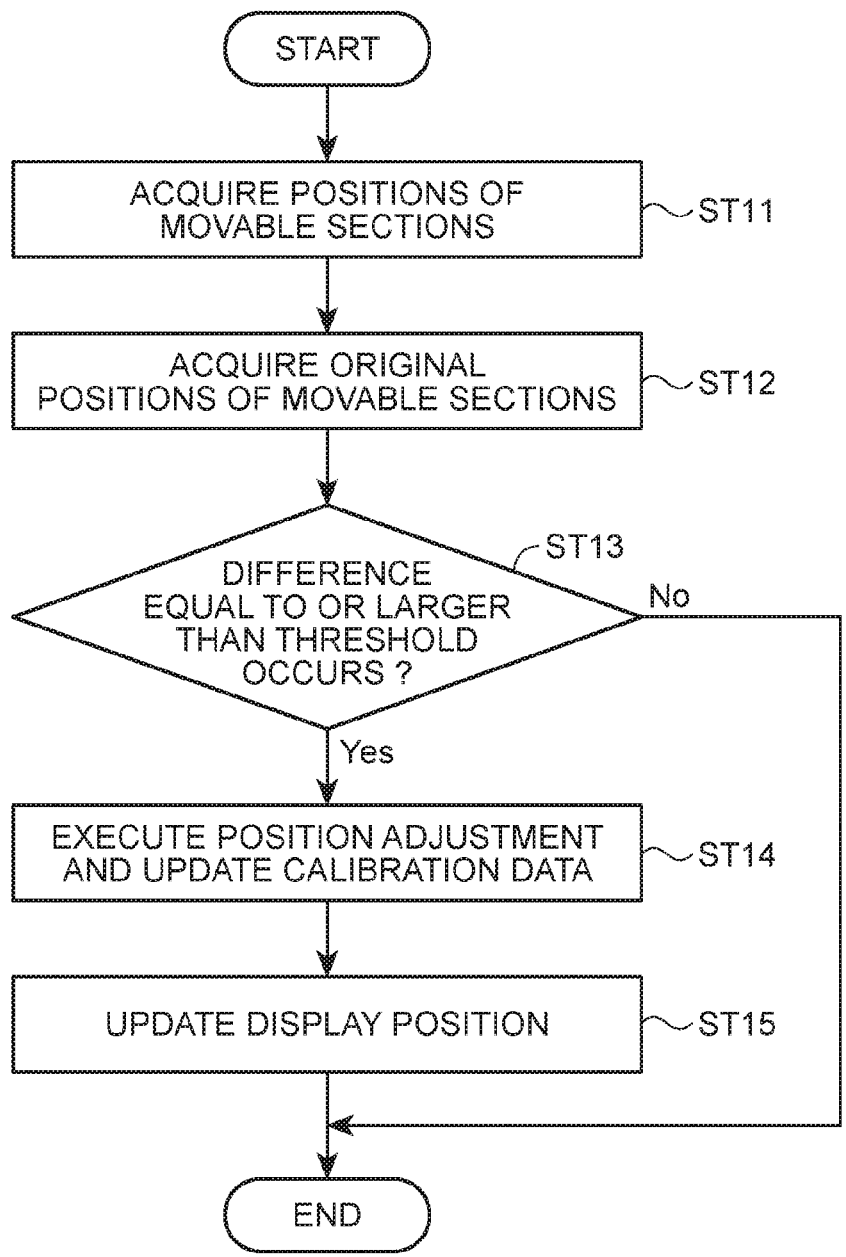
FIG. 11 is a flowchart for explaining the operation of the HMD in the first embodiment.

FIG. 11 is a flowchart for explaining the operation of the HMD 100.

While a power supply of the HMD 100 is on or while the AR image is displayed by the HMD 100, the control section 140 acquires respective detection values of the motion control sections 71, 72, and 73 and acquires positions in the movable sections on the basis of the acquired detection values (step ST11). The detection values acquired by the control section 140 are pulses or data output by the motion control sections 71, 72, and 73. The control section 140 calculates a position of the image pickup section 23 in the turning shaft R1, a position of the first end portion 41 in the turning shaft R2, and a position of the display section 3 in the moving mechanism 5 from the detection values of the motion control sections 71, 72, and 73 using an arithmetic expression, parameters, and the like set in advance.

The control section 140 acquires positions in the movable sections at the time when the calibration data 121 stored in the storing section 120 is generated (step ST12). The positions acquired by the control section 140 in step ST12 are stored in the storing section 120, for example, in association with the calibration data 121.

The control section 140 determines whether the positions acquired in step ST11 have a difference equal to or larger than a threshold set in advance with respect to the positions acquired in step ST12 (step ST13). If there is a difference equal to or larger than the threshold (Yes in step ST13), the control section 140 executes position adjustment (step ST14). More specifically, the control section 140 calculates relative positions of the image pickup section 23 and the display section 3, which represent the positional relationship therebetween, on the basis of the positions acquired in step ST11 and calculates data concerning association of a position in a picked-up image of the image pickup section 23 and a display position of the display section 3 to match the calculated relative positions. The control section 140 corrects the calibration data 121 anew on the basis of the calculated data. Also, the control section 140 corrects, on the basis of the difference, parameters representing rotations and translations between the image pickup section 23 and a screen in the optical device for left eye and parameters representing rotations and translations between the image pickup section 23 and a screen in the optical device for right eye to correct the calibration data 121. In this case, in this embodiment, the centers of the left and right respective screens are located on curved surfaces or planes of the respective half mirrors included in the optical devices for left eye and right eye. The screens are defined by respective XY planes having respective optical axes of the optical devices for left eye and right eye as normals. The control section 140 updates the calibration data 121 stored in the storing section 120 with the calibration data 121 after the correction. When updating the calibration data 121, the control section 140 may store data concerning the positions of the movable sections acquired in step ST11 in the storing section 120 in association with the calibration data 121. The control section 140 may generate data similar to the calibration data 121 generated by the initial calibration and stored in the storing section 120 and update the calibration data 121 of the storing section 120. The control section 140 may generate data for correction for correcting the calibration data 121 stored in the storing section 120 and store the data for correction in the storing section 120 or may add the data for correction to the calibration data 121 and update the calibration data 121.

Further, if there is an image currently displayed by the display section 3, the control section 140 adjusts a display position of the image on the basis of the calibration data 121 after the update (step ST15) and ends this processing. If the position acquired in step ST11 and the position acquired in step ST12 do not have a difference equal to or larger than the threshold (No in step ST13), the control section 140 ends this processing.

Note that, after ending this processing, the control section 140 only has to return to step ST11, for example, at every set time and acquire positions in the movable sections.

As explained above, the HMD 100 applied with the invention includes the display section 3 that displays an image while enabling visual recognition of an outside scene. The HMD 100 includes the image pickup section 23 that picks up an image in the image pickup range that overlaps at least the range visually recognized through the display section 3. The HMD 100 is configured to be capable of acquiring motion amounts in the movable sections. Consequently, it is possible to displace the image pickup section 23 with the movable sections and detect the displacement of the image pickup section 23. The HMD 100 updates the calibration data 121 according to a change in the position of the image pickup section 23 with respect to the display section 3. Consequently, it is possible to adjust the display position of the image in the display section 3 to an appropriate position according to the displacement in the movable sections.

The control section 140 can automatically execute the detection of the positions in the movable sections and the adjustment corresponding to the detected positions. Therefore, even if the user US does not repeatedly manually execute the initial calibration, it is possible to keep the display position proper and achieve improvement of convenience.

The HMD 100 includes the motion control sections 71, 72, and 73 provided in the movable sections and configured to detect motion amounts in the movable sections. The control section 140 detects relative positions of the image pickup section 23 and the display section 3, which represent the spatial relationship therebetween, on the basis of detection results of the motion control sections 71, 72, and 73. Therefore, it is possible to highly accurately detect the relative positions of the image pickup section 23 and the display section 3 by detecting motion amounts, directions of motions, and the like in the movable sections.

At least a part of the movable sections is turnable turning sections. For example, in the HMD 100 in this embodiment, the turning sections are capable of turning around the turning shafts R1 and R2. The motion control sections 71, 72, and 73 detect turning amounts in the turning sections. Therefore, it is possible to more accurately detect relative displacement of the image pickup section 23 with respect to the display section 3.

The movable sections are configured to be capable of moving stepwise by the motion control sections 71, 72, and 73. The motion control sections 71, 72, and 73 detect motions in the movable sections stepwise. Therefore, the control section 140 can acquire detection values corresponding to motion amounts in the movable sections and highly accurately calculate positions in the movable sections.

Second Embodiment

Figure 12:
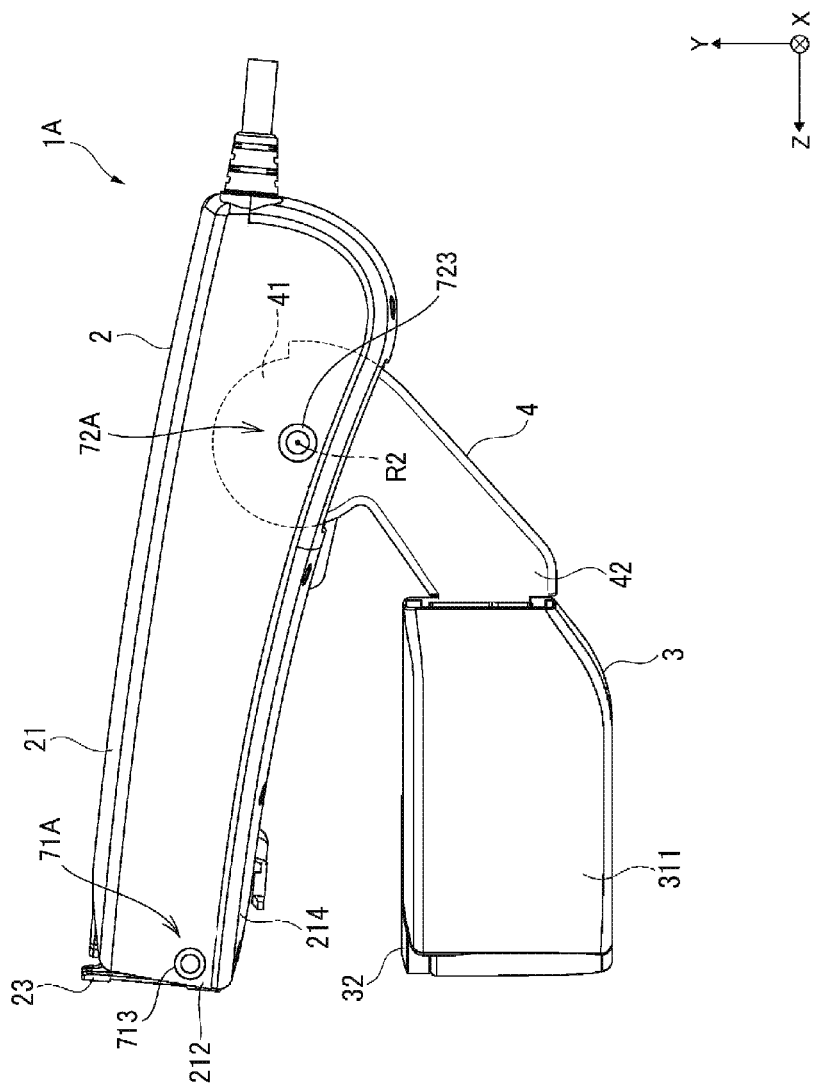
FIG. 12 is a side view of a virtual image display device in a second embodiment.

FIG. 12 is a side view showing the configuration of a virtual image display device 1A according to a second embodiment applied with the invention. The second embodiment includes configurations and functions common to the first embodiment except configurations related to motion control sections 71A and 72A and the operation of the control section 140 explained below. Therefore, in explanation of the second embodiment, sections having configurations same as the configurations in the first embodiment are denoted by the same reference numerals and signs and explanation concerning the same configurations and operations is omitted.

In the virtual image display device 1A, the motion control sections 71 and 72 included in the virtual image display device 1 explained in the first embodiment are replaced with motion control sections 71A and 72A and the motion control section 73 is removed.

In FIG. 12, the configuration of the motion control sections 71A and 72A in the second embodiment is shown.

The motion control section 71A in this embodiment functions as a sensor that detects a turning motion of the image pickup section 23. More specifically, the motion control section 71A includes a resolver 713 that detects a turning amount and a turning direction of the image pickup section 23 turning around the turning shaft R1. The resolver 713 is attached between the turning shaft section 236 and the image pickup section 23, turns together with the image pickup section 23, and outputs an output value corresponding to the turning amount. The output value of the resolver 713 is a value reflecting the turning direction.

Note that, in the motion control section 71A, an output circuit may be provided that generates data of a turning position of the display section 3 in the turning shaft R1 on the basis of the output value of the resolver 713 and outputs the data. In this case, the motion control section 71A can output the data of the turning position of the image pickup section 23 to the control section 140 (FIG. 13) explained below.

The motion control section 72A in this embodiment functions as a sensor that detects a turning motion of the arm 4. More specifically, the motion control section 72A includes a resolver 723 that detects a turning amount and a turning direction of the arm section 4 turning around the turning shaft R2. The resolver 723 is attached between the turning shaft section 25 and the first end portion 41, turns together with the first end portion 41, and outputs an output value corresponding to the turning amount. The output value of the resolver 723 is a value reflecting the turning direction.

Note that, in the motion control section 72A, an output circuit may be provided that generates data of a turning position of the first end portion 41 in the turning shaft R2 on the basis of the output value of the resolver 723 and outputs the data. In this case, the motion control section 72A can output the data of the turning position of the first end portion 41 to the control section 140 (FIG. 13) explained below.

The virtual image display device 1A in the second embodiment does not include means for detecting a slide amount of the moving mechanism 5. However, for example, the motion control section 73 explained in the first embodiment may be provided in the moving mechanism 5.

Figure 13:
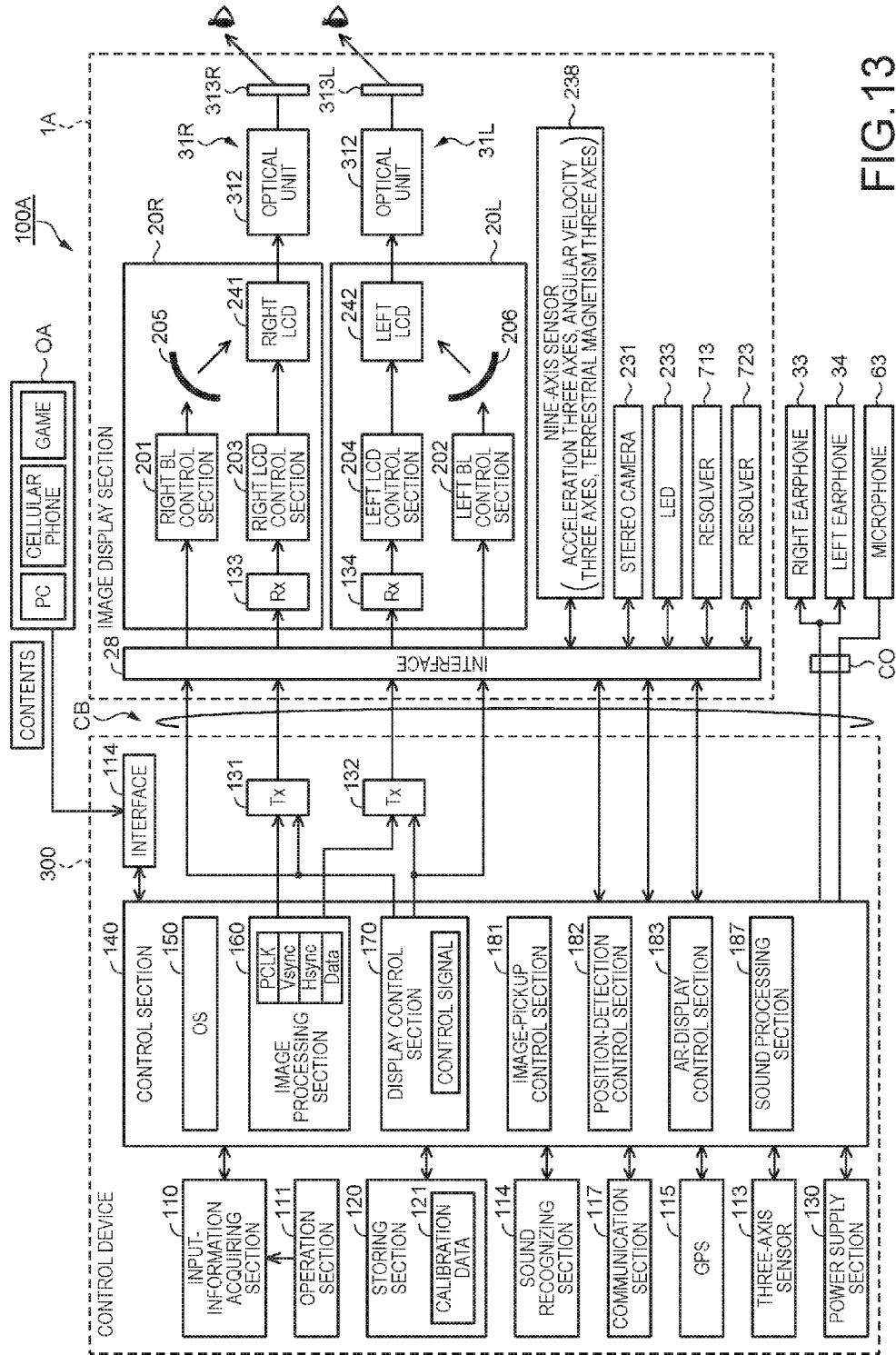
FIG. 13 is a functional block diagram of an HMD in the second embodiment.

FIG. 13 is a functional block diagram of an HMD 100A in the second embodiment.

In the HMD 100A in the second embodiment, the virtual image display device 1 in the HMD 100 in the first embodiment is replaced with the virtual image display device 1A. That is, in the HMD 100A, the motion control sections 71 and 72 included in the HMD 100 are replaced with the motion control sections 71A and 72A and the motion control section 73 is removed.

That is, the resolvers 713 and 723 included in the virtual image display device 1A are connected to the control section 140 via the interface 28. The control section 140 can acquire output values of the resolvers 713 and 723 with a function of the position-detection control section 182 and calculate a position of the image pickup section 23 in the turning shaft R1 and a position of the first end portion 41 in the turning shaft R2.

In the second embodiment, the control section 140 acquires the output values of the resolvers 713 and 723 in step ST11 of the operation explained with reference to FIG. 11. The control section 140 acquires positions around the turning shafts R1 and R2 from the output values of the resolvers 713 and 723 and executes the operations in steps ST12 to ST15.

With the configuration in the second embodiment, it is possible to detect the positions in the turning shafts R1 and R2, which are movable sections, as in the first embodiment and automatically appropriately adjust the display position of the display section 3.

When the resolvers 713 and 723 are used, the motions in the turning shafts R1 and R2 are not limited to stepwise motions. Therefore, it is possible to finely adjust the turning positions in the turning shafts R1 and R2.

Note that, instead of the resolvers 713 and 723 in this embodiment, volumes (variable resistors) or potentiometers that detect turning angles may be used.

Third Embodiment

Figure 14:
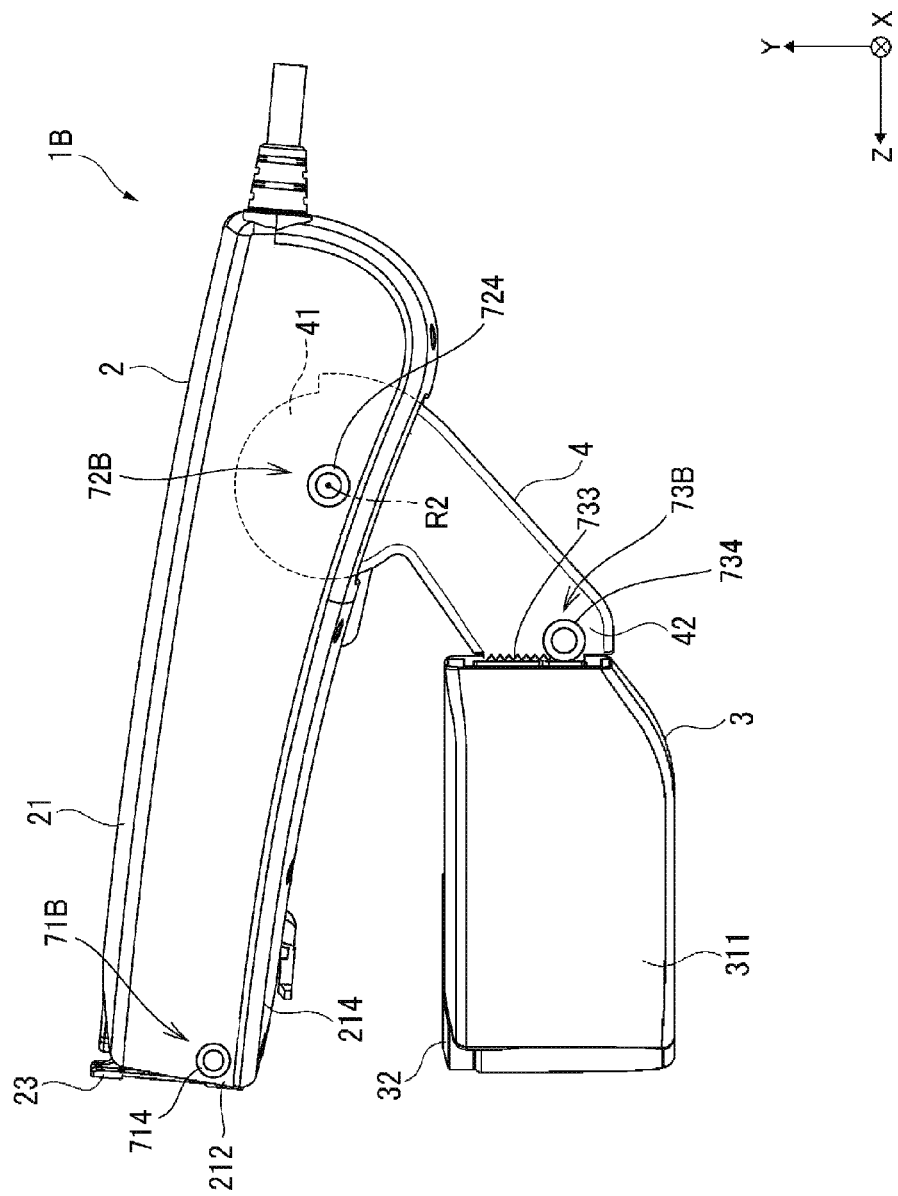
FIG. 14 is a side view of a virtual image display device in a third embodiment.

FIG. 14 is a side view showing the configuration of a virtual image display device 1B according to a third embodiment applied with the invention. The third embodiment includes configurations and functions common to the first embodiment except configurations related to motion control sections 71B, 72B, and 73B and the operation of the control section 140 explained below. Therefore, in explanation of the third embodiment, sections having configurations same as the configurations in the first embodiment are denoted by the same reference numerals and signs and explanation concerning the same configurations and operations is omitted.

In the virtual image display device 1B, the motion control sections 71, 72, and 73 included in the virtual image display device 1 explained in the first embodiment are replaced with the motion control sections 71B, 72B, and 73B.

Figure 15:
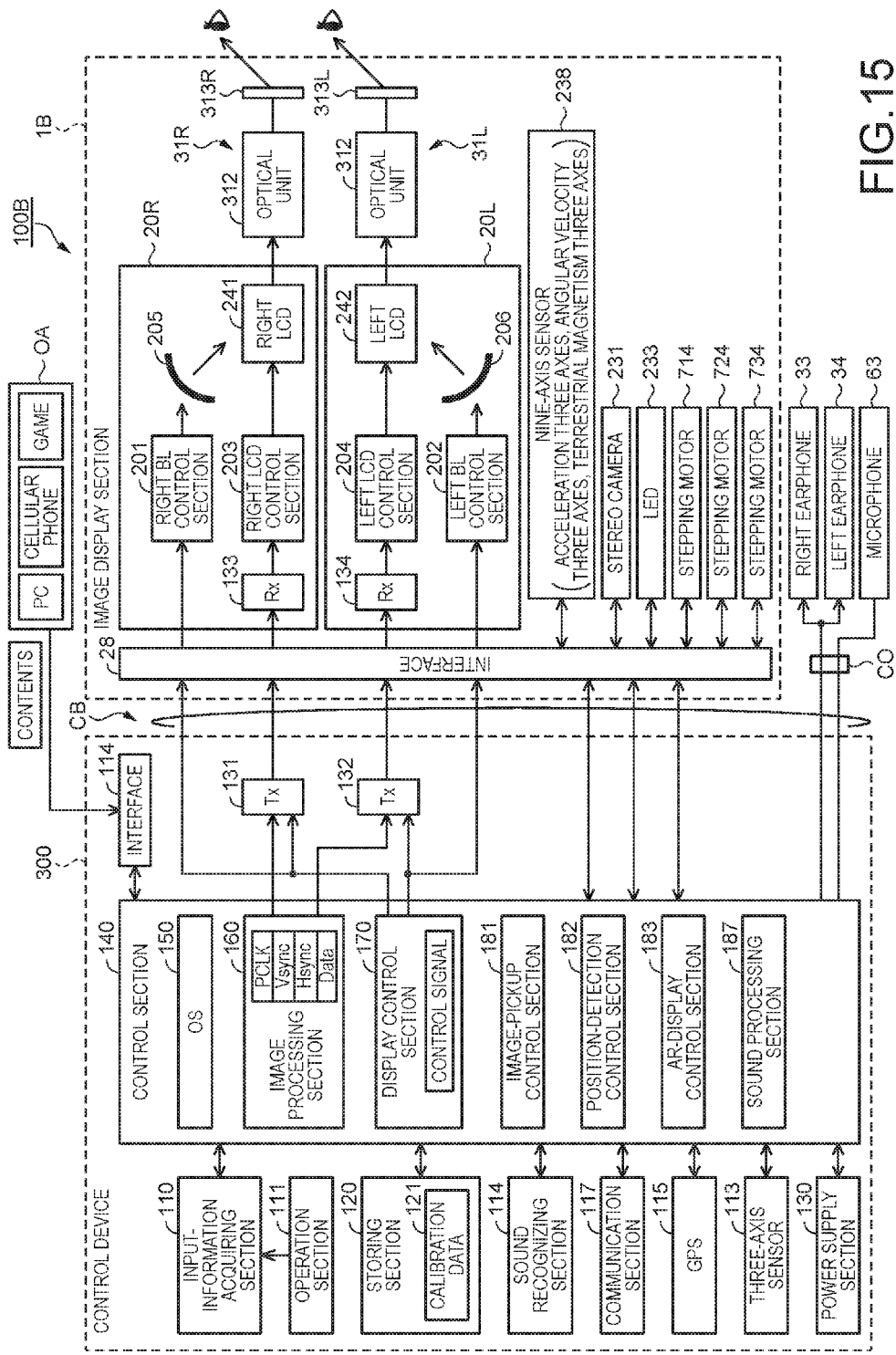
FIG. 15 is a functional block diagram of an HMD in the third embodiment.

The motion control section 71B includes a stepping motor 714 and functions as a driving section that turns the image pickup section 23 around the turning shaft R1. The stepping motor 714 rotates in a rotation amount and a rotating direction corresponding to a pulse output by the control section 140 (FIG. 15). The stepping motor 714 is fixed to the headband section 2 side in the turning shaft section 236. The stepping motor 714 turns the image pickup section 23. A driving shaft or an output shaft of the stepping motor 714 may be the turning shaft section 236. The stepping motor 714 may be provided on the image pickup section 23 side. However, it is advantageous to provide the stepping motor 714 on the headband section 2 side because the image pickup section 23 can be reduced in weight.

The motion control section 72B in this embodiment includes a stepping motor 724 and functions as a driving section that turns the first end portion 41 around the turning shaft R2. The stepping motor 724 rotates in a rotation amount and a rotating direction corresponding to a pulse output by the control section 140 (FIG. 15). The stepping motor 724 is fixed to the headband section 2 side in the turning shaft section 25. The stepping motor 724 turns the first end portion 41. A driving shaft or an output shaft of the stepping motor 724 may be the turning shaft section 25. The stepping motor 724 may be provided on the first end portion 41 side. However, it is advantageous to provide the stepping motor 724 on the headband section 2 side because the arm section 4 can be reduced in weight and the number of wirings from the headband section 2 to the arm section 4 is small.

The motion control section 73B in this embodiment includes a stepping motor 734 and functions as a driving section that moves the slide member 52 along the guiderail 51 in the moving mechanism 5. The stepping motor 734 rotates in a rotation amount and a rotating direction corresponding to a pulse output by the control section 140 (FIG. 15). For example, the motion control section 73B can be configured such that the stepping motor 734 is fixed to the second end portion 42, a gear (not shown in the figure) is provided in an output shaft of the stepping motor 734, and the gear meshes with a rack (not shown in the figure) provided on the slide member 52 side. In this case, the slide member 52 moves up and down along the guiderail 51 according to the rotation of the stepping motor 734.

FIG. 15 is a functional block diagram of a HMD 100B in the third embodiment.

In the HMD 100B in the third embodiment, the virtual image display device 1 in the HMD 100 in the first embodiment is replaced with a virtual image display device 1B. That is, in the HMD 100B, the motion control sections 71, 72, and 73 included in the HMD 100 are replaced with the motion control sections 71B, 72B, and 73B.

The stepping motors 714, 724, and 734 included in the virtual image display device 1B are respectively connected to the control section 140 via the interface 28. The control section 140 outputs, with the function of the position-detection control section 182, driving pulses to the respective stepping motors 714, 724, and 734 to thereby rotate the stepping motors 714, 724, and 734.

Figure 16:
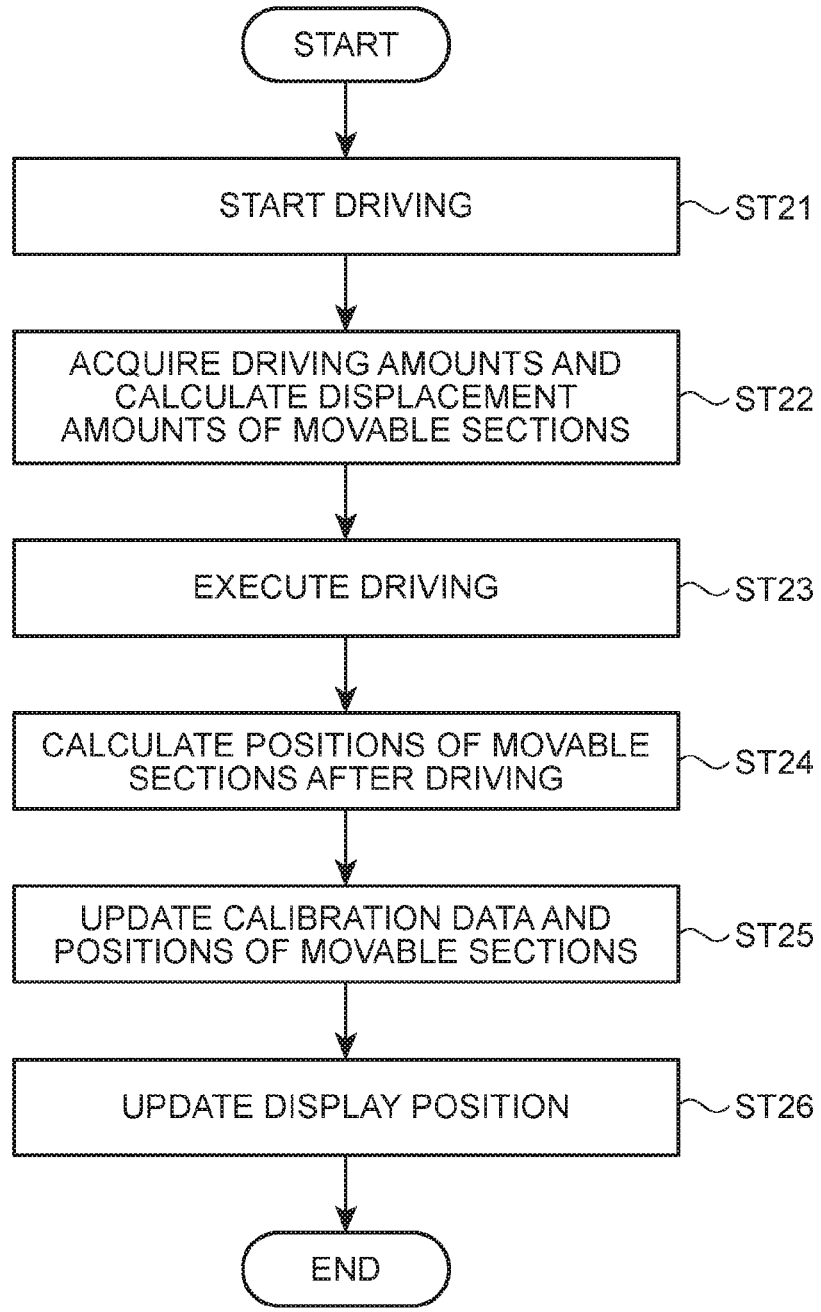
FIG. 16 is a flowchart for explaining the operation of the HMD in the third embodiment.

FIG. 16 is a flowchart for explaining the operation of the HMD 100B in the third embodiment.

The control section 140 stands by for input operation of the track pad 302 or the like while a power supply of the HMD 100B is on or while an AR image is displayed by the HMD 100B. When the input operation of the track pad 302 or the like is an instruction of driving of the movable sections, the control section 140 executes an operation shown in FIG. 16.

After starting processing for driving the motion control sections 71B, 72B, and 73B (step ST21), the control section 140 acquires driving amounts of the motion control sections 71B, 72B, and 73B on the basis of the input operation of the control device 300 and calculates displacement amounts of the movable sections (step ST22). In step ST22, the control section 140 acquires of the respective rotation amounts and rotating directions stepping motors 714, 724, and 734 configuring the motion control sections 71B, 72B, and 73B. The control section 140 calculates, on the basis of the rotation amounts and the rotating directions of the stepping motors, respective change amounts of the position of the image pickup section 23 in the turning shaft R1, the position of the first end portion 41 in the turning shaft R2, and the position of the display section 3 in the moving mechanism 5.

The control section 140 causes the stepping motors 714, 724, and, 734 to operate according to the driving amounts acquired in step ST22 (step ST23). Further, the control section 140 calculates positions of the movable sections after the driving on the basis of the displacement amounts calculated in step ST22 (step ST24). As explained below, the control section 140 stores the positions of the movable sections in association with the calibration data 121. Therefore, the control section 140 calculates the positions of the movable sections after the driving by adding the displacement amounts calculated in step ST22 to the positions of the movable sections stored in the storing section 120 at the time when the last driving is performed.

Thereafter, the control section 140 calculates relative positions of the image pickup section 23 and the display section 3 after the driving and calculates data concerning association of a position in a picked-up image of the image pickup section 23 and a display position of the display section 3 to match the calculated relative positions. The control section 140 corrects the calibration data 121 anew on the basis of the calculated data (step ST25). Alternatively, the control section 140 may correct the calibration data 121 by correcting, on the basis of the data, parameters representing rotations and translations between the image pickup section 23 and the screen in the optical device for left eye, parameters representing rotations and translations between the image pickup section 23 and the screen in the optical device for right eye, and the like. In this case, in this embodiment, the centers of the left and right respective screens are located on curved surfaces or planes of respective half mirrors included in the optical devices for left eye and right eye and are defined by respective XY planes having respective optical axes of the optical devices for left eye and right eye as normals. The control section 140 updates the calibration data 121 stored in the storing section 120 with the calibration data 121 after the correction. When updating the calibration data 121, the control section 140 stores data concerning the positions of the movable sections calculated in step ST24 in the storing section 120 in association with the calibration data 121. In step ST25, as in step ST14, the control section 140 may generate data similar to the calibration data 121 generated in the initial calibration and stored in the storing section 120 and update the calibration data 121 of the storing section 120. The control section 140 may generate data for correction for correcting the calibration data 121 stored in the storing section 120 and store the data for correction in the storing section 120 or may add the data for correction to the calibration data 121 and update the calibration data 121.

Further, if there is an image currently displayed by the display section 3, the control section 140 adjusts a display position of the image on the basis of the calibration data 121 after the update (step ST26) and ends this processing.

Note that, in the third embodiment, deceleration mechanisms may be provided in the output shafts of the stepping motors 714, 724, and 734. In this case, the control section 140 only has to calculate displacement amounts of the movable sections taking into account a reduction ratio of the deceleration mechanisms in addition to the respective driving amounts of the stepping motors 714, 724, and 734. In the HMD 100B, a motor driver circuit may be provided that outputs driving currents and driving pulses to the stepping motors 714, 724, and 734 according to control by the control section 140.

In this configuration, since the virtual image display device 1B includes the stepping motors 714, 724, and 734 functioning as driving sections that drive the movable sections, it is possible to automatically change the positions of the movable sections. Therefore, it is possible to reduce a burden on the user US and achieve improvement of convenience. The control section 140 can control driving amounts of the stepping motors 714, 724, and 734 according to, for example, the number of pulses for driving the stepping motors 714, 724, and 734. That is, the control section 140 can indirectly detect displacement amounts of the movable sections from the driving pulses for the stepping motors 714, 724, and 734.

Fourth Embodiment

Figure 17:
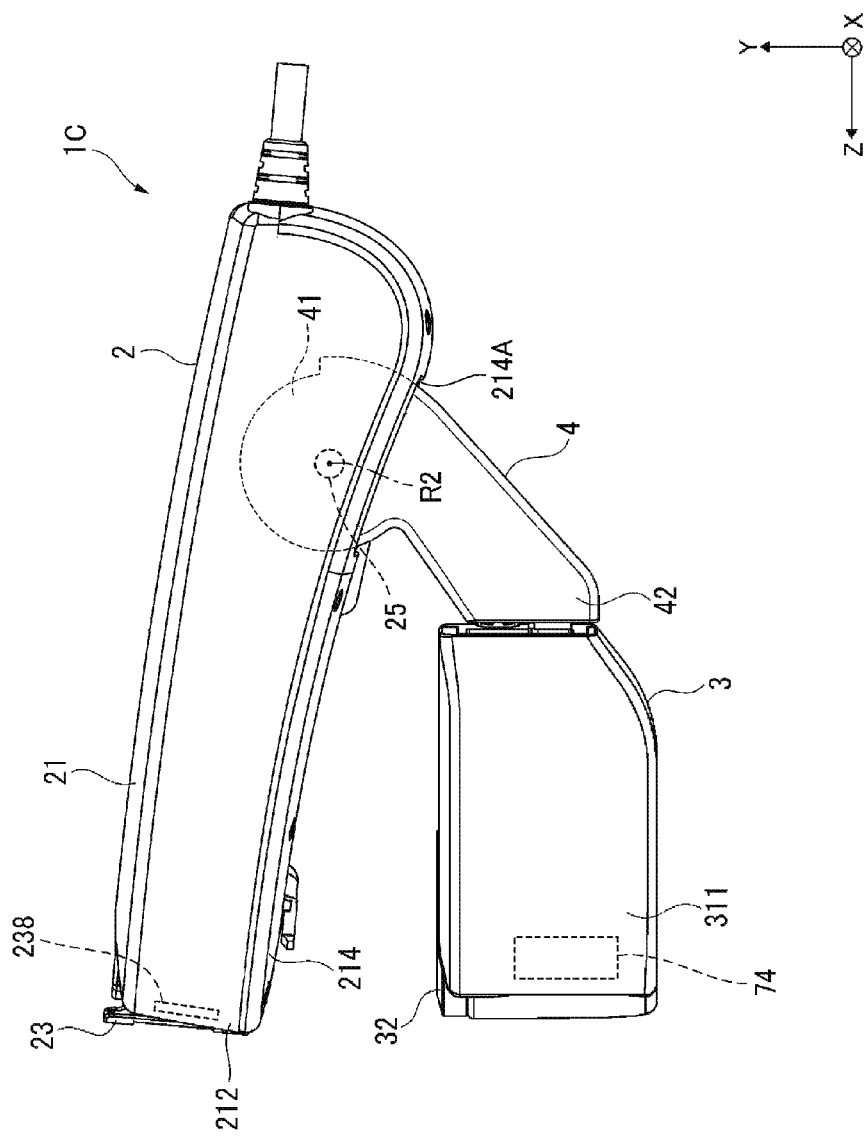
FIG. 17 is a side view of a virtual image display device in a fourth embodiment.

FIG. 17 is a side view showing the configuration of a virtual image display device 1C according to a fourth embodiment applied with the invention. The fourth embodiment includes configurations and functions common to the first embodiment except configurations related to the motion control sections 71A and 72A and the operation of the control section 140 explained below. Therefore, in explanation of the fourth embodiment, sections having configurations same as the configurations in the first embodiment are denoted by the same reference numerals and signs and explanation concerning the same configurations and operations is omitted.

In the virtual image display device 1C, the motion control sections 71 and 72 included in the virtual image display device 1 in the first embodiment are removed and an inertial sensor 74 is provided.

FIG. 17 is a side view of the virtual image display device in the fourth embodiment. As shown in FIG. 17, the inertial sensor 74 is provided in the display section 3. The position of the inertial sensor 74 is not limited as long as the position is a position moved up and down by the moving mechanism 5 together with the optical devices 31. The inertial sensor 74 only has to be provided, for example, on the rear surface of the cover member 311 located in a side end portion of the display section 3.

Like the virtual image display device 1 in the first embodiment, the virtual image display device 1C includes the nine-axis sensor 238 in the image pickup section 23.

Figure 18:
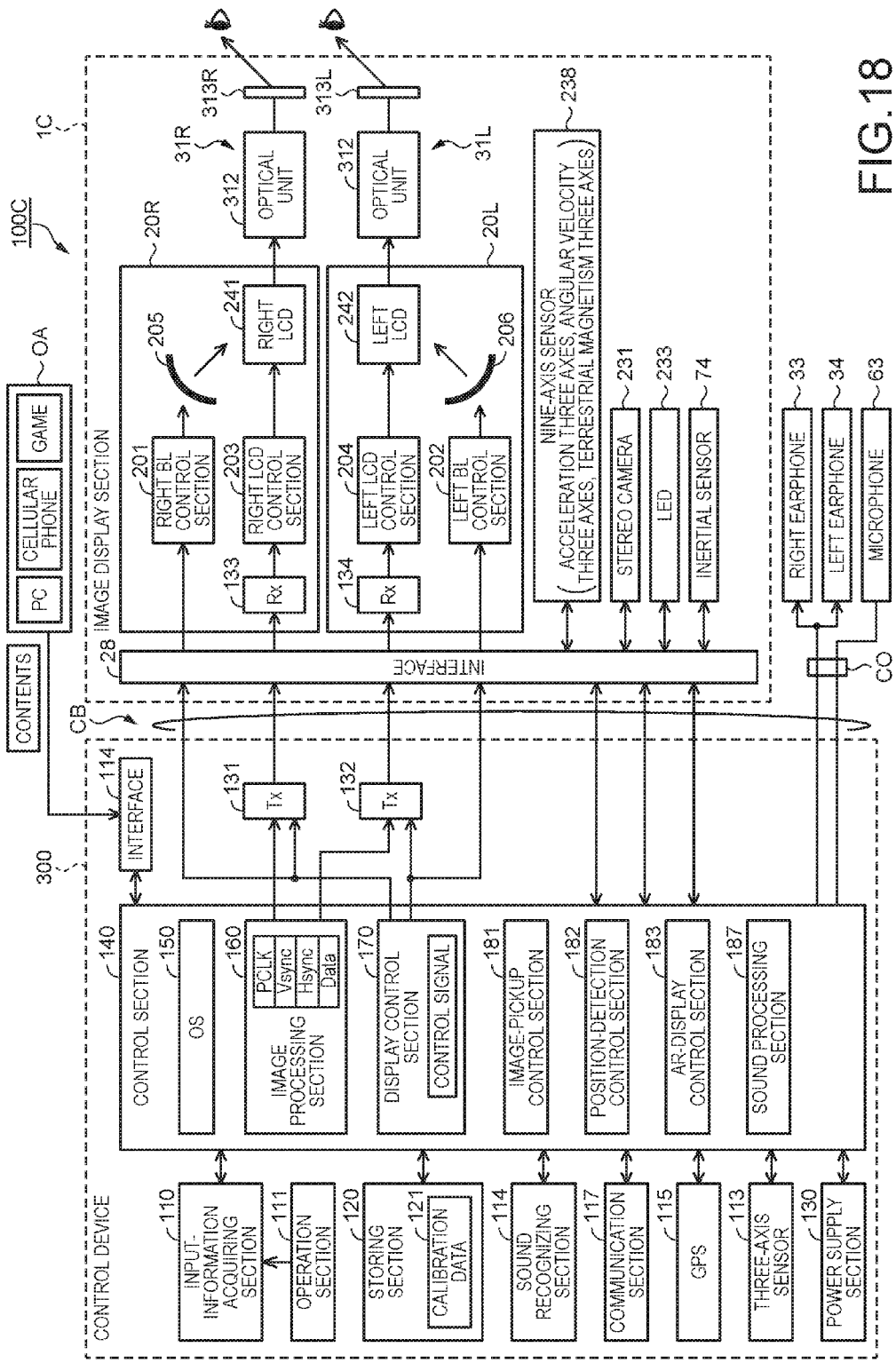
FIG. 18 is a functional block diagram of an HMD in the fourth embodiment.

FIG. 18 is a functional block diagram of an HMD 100C in the fourth embodiment.

In the HMD 100C in the fourth embodiment, the virtual image display device 1 in the HMD 100 in the first embodiment is replaced with the virtual image display device 1C. That is, in the HMD 100B, the motion control sections 71, 72, and 73 included in the HMD 100 are removed and the inertial sensor 74 is provided.

The inertial sensor 74 included in the virtual image display device 1C is connected to the control section 140 via the interface 28. The control section 140 acquires an output value of the inertial sensor 74 via the interface 28.

The inertial sensor 74 is an acceleration sensor or an angular velocity sensor. In the fourth embodiment, the inertial sensor 74 includes a three-axis acceleration sensor.

Figure 19:
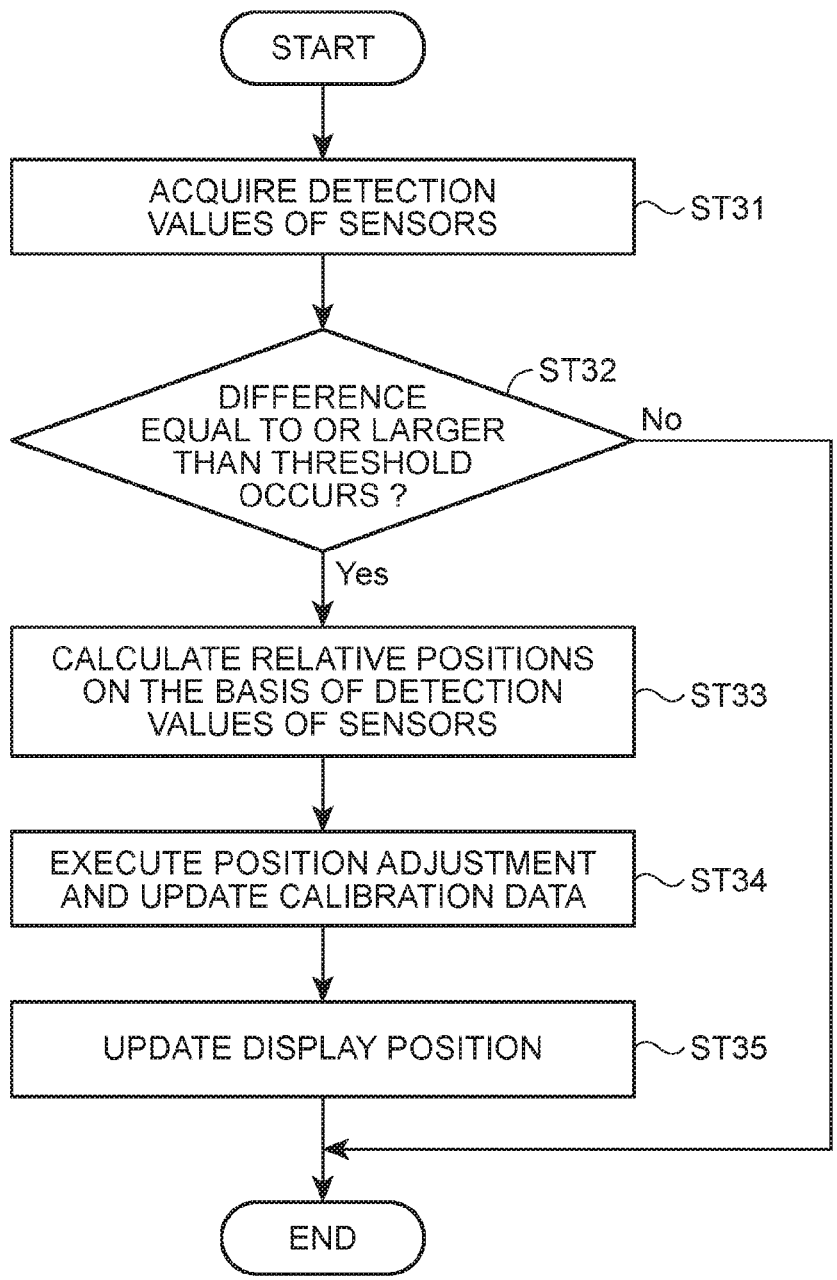
FIG. 19 is a flowchart for explaining the operation of the HMD in the fourth embodiment.

FIG. 19 is a flowchart for explaining the operation of the HMD 100C.

The control section 140 acquires respective detection values of the inertial sensor 74 and the nine-axis sensor 238 while a power supply of the HMD 100C is on or while an AR image is displayed by the HMD 100C (step ST31). The control section 140 determines, on the basis of the acquired detection values, whether at least one of the image pickup section 23 and the display section 3 performs displacement equal to or larger than a threshold set in advance (step ST32).

If displacement equal to or larger than the threshold occurs (Yes in step ST32), the control section 140 calculates relative positions of the image pickup section 23 and the display section 3 on the basis of the detection values of the inertial sensor 74 and the nine-axis sensor 238 (step ST33). The control section 140 may use relative positions of the image pickup section 23 and the display section 3 before the occurrence of the displacement. For example, when the calibration data 121 is updated as explained below, the relative positions are stored in the storing section 120 in association with the calibration data 121. The control section 140 may read out data related to the relative positions from the storing section 120. The control section 140 may acquire detection values of the nine-axis sensor 238 and the inertial sensor 74 at a predetermined cycle, store the detection values in the storing section 120 or a RAM (not shown in the figure), integrate the detection values to calculate a displacement amount in step ST33, and calculate relative positions.

The control section 140 executes position adjustment for calculating data concerning association of a position in a picked-up image of the image pickup section 23 and a display position of the display section 3 to match the calculated relative positions (step ST34). In step ST34, the control section 140 generates, on the basis of the calculated data, data for correcting the calibration data 121 and corrects and updates the calibration data 121 stored in the storing section 120 with the generated data. When updating the calibration data 121, the control section 140 may store data concerning the relative positions calculated in step ST33 in the storing section 120 in association with the calibration data 121. In step ST34, as in step ST14 explained above, the control section 140 may generate data similar to the calibration data 121 generated in the initial calibration and stored in the storing section 120 and update the calibration data 121 stored in the storing section 120. The control section 140 may generate data for correction for correcting the calibration data 121 stored in the storing section 120 and store the data for correction in the storing section 120 or may add the data for correction to the calibration data 121 and update the calibration data 121.

Alternatively, the control section 140 may correct the calibration data 121 by correcting, on the basis of the calculated data, parameters representing rotations and translations between the image pickup section 23 and the screen in the optical device for left eye and parameters representing rotations and translations between the image pickup section 23 and the screen in the optical device for right eye. In this case, in this embodiment, the centers of the left and right respective screens are located on curved surfaces or planes of respective half mirrors included in the optical devices for left eye and right eye and are defined by respective XY planes having respective optical axes of the optical devices for left eye and right eye as normals. The control section 140 updates the calibration data 121 stored in the storing section 120 with the calibration data 121 after the correction.

Further, if there is an image currently displayed by the display section 3, the control section 140 adjusts a display position of the image on the basis of the calibration data 121 after the update (step ST35) and ends this processing. If determining in step ST32 that the displacement is not equal to or larger than the threshold (No step ST32), the control section 140 ends this processing.

Note that, after ending this processing, the control section 140 only has to return to step ST31, for example, at every time set in advance and acquire detection values of the sensors.

As explained above, the HMD 100C according to the fourth embodiment includes the display section 3 that displays an image while enabling visual recognition of an outside scene and the image pickup section 23 that picks up an image in the image pickup range that overlaps at least the range visually recognized through the display section 3. The HMD 100C includes the nine-axis sensor 238 (the first movement detecting section) that detects a movement of the display section 3 and the inertial sensor 74 (the second movement detecting section) that detects a movement of the image pickup section 23. Consequently, in the display device capable of displacing the image pickup section 23, it is possible to highly accurately detect displacement of the image pickup section 23 with respect to the display section 3 using the sensors.

The HMD 100C includes, as the first movement detecting section, the nine-axis sensor 238 (the first inertial sensor) fixed to the display section 3 and uses, as the second movement detecting section, the inertial sensor 74 (the second inertial sensor) fixed to the image pickup section 23. In this way, it is possible to highly accurately detect displacement of the image pickup section 23 with respect to the display section 3 using the plurality of inertial sensors. Note that the first inertial sensor only has to be capable of detecting at least acceleration or angular velocity and is not limited to the nine-axis sensor. The second inertial sensor is not limited to the acceleration sensor and may be an angular velocity sensor or may be a sensor unit (a so-called IMU: Inertial Measurement Unit) including the acceleration sensor and the angular velocity sensor.

The HMD 100C can calculate, with the control section 140, relative positions of the image pickup section 23 and the display section 3. Further, the control section 140 can calculate relative positions of the image pickup section 23 and the display section 3 and adjust a display position of an image in the display section 3 to match the calculated relative positions.

Fifth Embodiment

Figure 20:
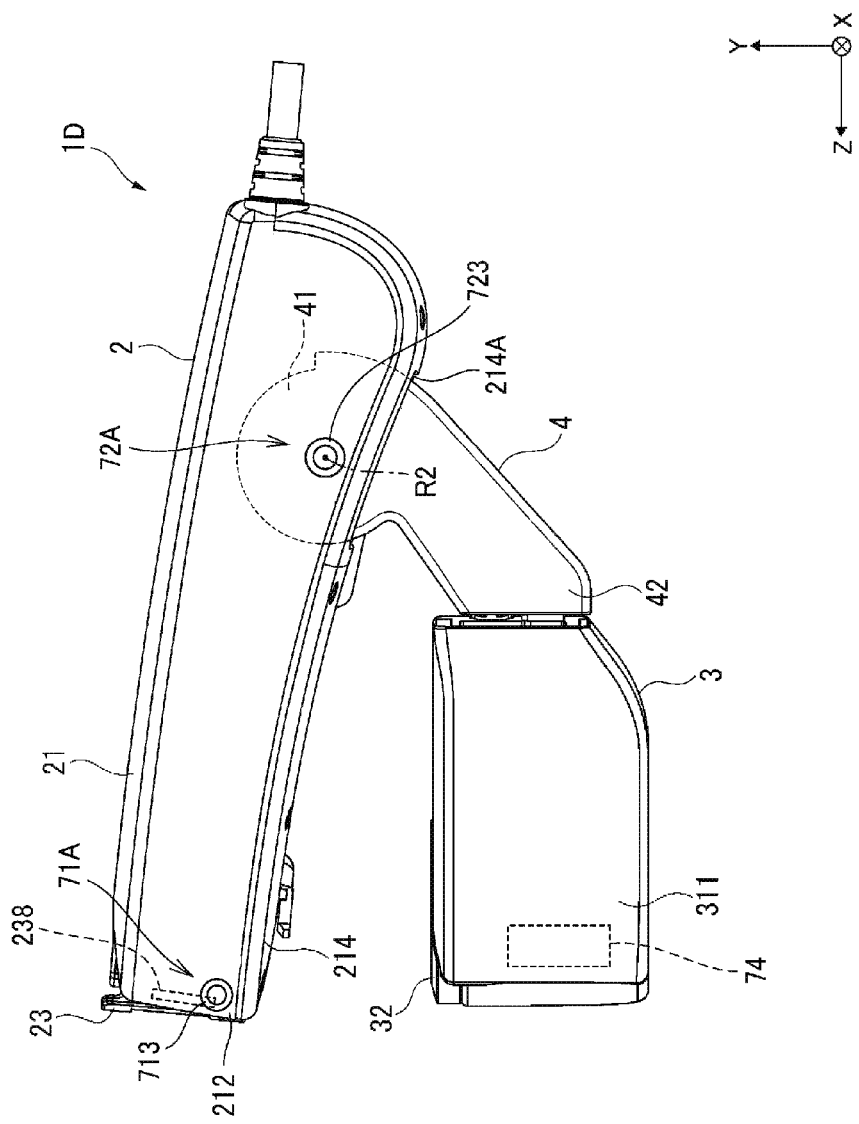
FIG. 20 is a side view of a virtual image display device in a fifth embodiment.

FIG. 20 is a side view showing the configuration of a virtual image display device 1D according to a fifth embodiment applied with the invention. The fifth embodiment includes configurations and functions common to the fourth embodiment except configurations related to the motion control sections 71A and 72A and the operation of the control section 140 explained below. Therefore, in explanation of the fifth embodiment, sections having configurations same as the configurations in the fourth embodiment are denoted by the same reference numerals and signs and explanation concerning the same configurations and operations is omitted.

In the virtual image display device 1D, the motion control sections 71A and 72A are further provided in the virtual image display device 1C explained in the fourth embodiment.

The motion control sections 71A and 72A include the configuration explained in the second embodiment. That is, the motion control section 71A functions as a sensor that detects a turning motion of the image pickup section 23. The motion control section 71A includes the resolver 713 that detects a turning amount and a turning direction of the image pickup section 23 turning around the turning shaft R1. The resolver 713 is attached between the turning shaft section 236 and the image pickup section 23, turns together with the image pickup section 23, and outputs an output value corresponding to the turning amount. The output value of the resolver 713 is a value reflecting the turning direction.

Note that, in the motion control section 71A, an output circuit may be provided that generates data of a turning position of the display section 3 in the turning shaft R1 on the basis of the output value of the resolver 713 and outputs the data. In this case, the motion control section 71A can output the data of the turning position of the image pickup section 23 to the control section 140 (FIG. 21) explained below.

The motion control section 72A functions as a sensor that detects a turning motion of the arm 4. The motion control section 72A includes the resolver 723 that detects a turning amount and a turning direction of the arm section 4 turning around the turning shaft R2. The resolver 723 is attached between the turning shaft section 25 and the first end portion 41, turns together with the first end portion 41, and outputs an output value corresponding to the turning amount. The output value of the resolver 723 is a value reflecting the turning direction.

Note that, in the motion control section 72A, an output circuit may be provided that generates data of a turning position of the first end portion 41 in the turning shaft R2 on the basis of the output value of the resolver 723 and outputs the data. In this case, the motion control section 72A can output the data of the turning position of the first end portion 41 to the control section 140 (FIG. 21) explained below.

Figure 21:
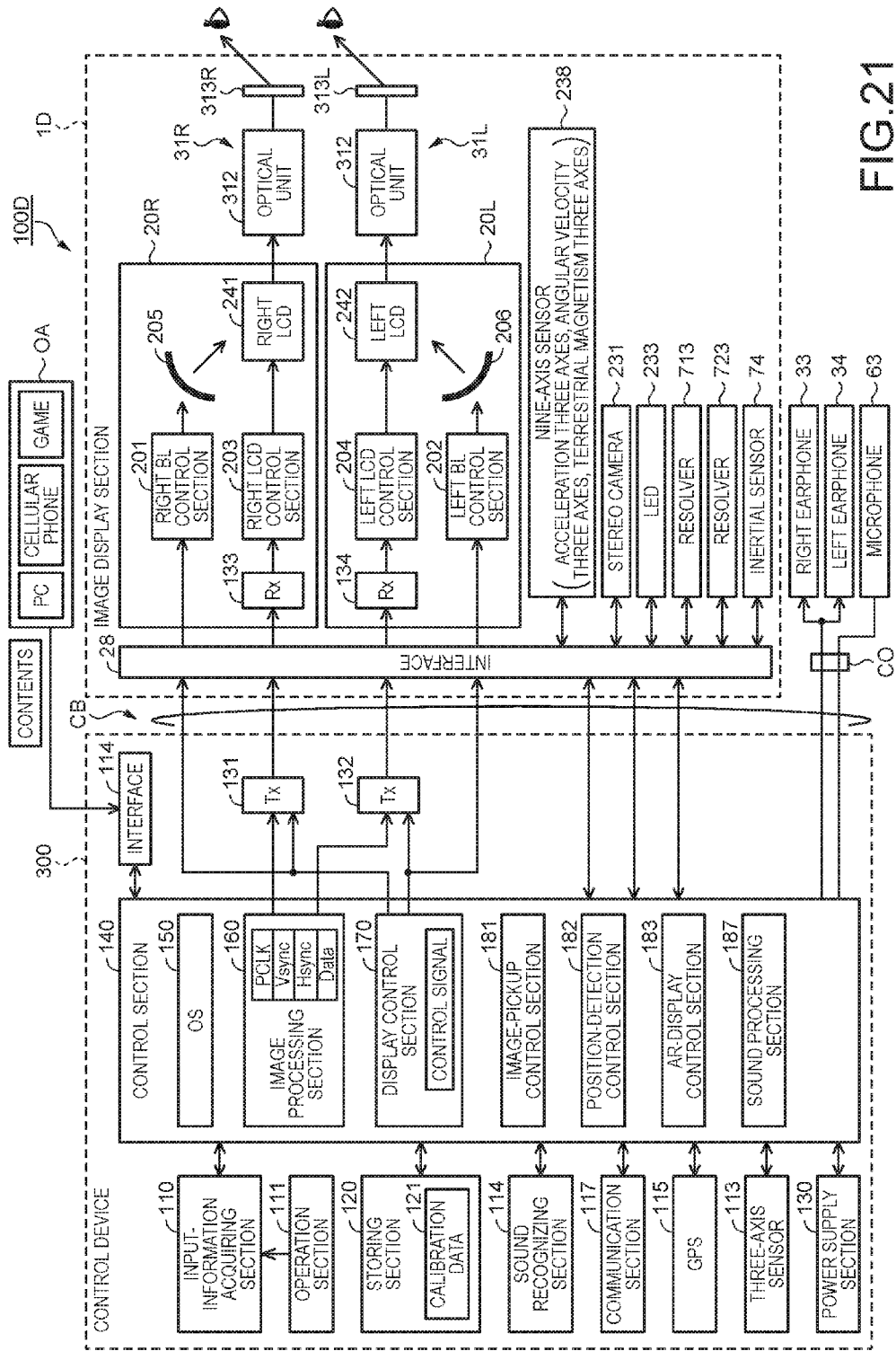
FIG. 21 is a functional block diagram of an HMD in the fifth embodiment.

FIG. 21 is a functional block diagram of an HMD 100D in the fifth embodiment.

In the HMD 100D in the fifth embodiment, the virtual image display device 1C in the HMD 100C in the fourth embodiment is replaced with the virtual image display device 1D. That is, in the HMD 100D, the motion control sections 71A and 72A are provided in the HMD 100C.

The resolvers 713 and 723 are connected to the control section 140 via the interface 28. The control section 140 can acquire, with the function of the position-detection control section 182, output values of the resolvers 713 and 723 and calculate a position of the image pickup section 23 in the turning shaft R1 and a position of the first end portion 41 in the turning shaft R2.

In step ST31 of the operation explained with reference to FIG. 19, the control section 140 acquires output values of the resolvers 713 and 723 in addition to detection values of the nine-axis sensor 238 and the inertial sensor 74. The control section 140 performs determination based on the values acquired instep ST31 (step ST32). If determining that displacement equal to or larger than the threshold occurs (Yes in step ST32), the control section 140 calculates relative positions of the image pickup section 23 and the display section 3 (step ST33). In step ST33, the control section 140 may calculate the relative positions using the output values of the resolvers 713 and 723 in addition to the detection values of the nine-axis sensor 238 and the inertial sensor 74.

The resolvers 713 and 723 output output values indicating turning positions in the turning sections. On the other hand, the nine-axis sensor 238 and the inertial sensor 74 output acceleration, angular velocity, and the like. Therefore, when detecting presence or absence of displacement of the image pickup section 23 and the display section 3, speed of the displacement, and the like, it is possible to accurately and easily perform the determination if the detection values of the nine-axis sensor 238 and the inertial sensor 74 are used. When calculating positions of the image pickup section 23 and the first end portion 41, it is suitable to use the output values of the resolvers 713 and 723. Therefore, the control section 140 may use the detection values of the nine-axis sensor 238 and the inertial sensor 74 in step ST31 and use the output values of the resolvers 713 and 723 in step ST33.

In the fifth embodiment, the virtual image display device 1D includes the motion control sections 71A and 72A (the motion-amount detecting sections) that detect motion amounts in the movable sections. The control section 140 detects relative positions of the image pickup section 23 and the display section 3 on the basis of detection results of the nine-axis sensor 238, the inertial sensor 74, and the motion control sections 71A and 72A. In this configuration, it is possible to more highly accurately detect the displacement of the image pickup section 23 with respect to the display section 3 using detection results of the plurality of detecting sections. Since the control section 140 can automatically adjust a display position, there is an advantage that it is possible to keep the display position proper without increasing a burden on the user US.

Note that, instead of the resolvers 712 and 723 in this embodiment, volumes (variable resistors) or potentiometers that detect turning angles may be used.

Modifications of the Embodiments

The invention is not limited to the embodiments explained above. Modifications, improvements, and the like within a range in which the object of the invention can be achieved are included in the invention.

In the embodiments, the configuration is illustrated in which the virtual image display device includes the pair of arm sections 4 and the pair of arm sections 4 supports the display section 3 from both the sides in the X direction. However, the invention is not limited to this. For example, the virtual image display device may include one arm section 4. In this case, the arm section 4 may be connected to substantially the center in the X direction of the display section 3 or may be connected to one end side in the X direction. In such a configuration, it is possible to reduce the number of components configuring the virtual image display device 1 and achieve a reduction in weight of the virtual image display device 1. Note that, in the configuration in which the display section 3 is supported from both the sides by the pair of arms 4, it is possible to more stably support the display section 3 than supporting the display section 3 in one place.

In the embodiments, the configuration is illustrated in which the display section 3 includes the optical device for left eye 31L and the optical device for right eye 31R and the pair of optical devices 31 is integrally fixed by the frame section 32 and integrally turned by the pair of arm sections 4. However, the invention is not limited by this. For example, the optical device for right eye 31R may be configured to be capable of being individually turned by the arm section 4 on the right side viewed from the user US. The optical device for left eye 31L may be configured to be capable of being individually turned by the arm section 4 on the left side viewed from the user US.

In the embodiments, the configuration is illustrated in which the display section 3 includes the optical device for left eye 31L and the optical device for right eye 31R. However, the invention is not limited to this. That is, a configuration may be adopted in which the display section 3 includes one of the optical device for left eye 31L and the optical device for right eye 31R. In this case, the display device 3 may be configured to be supported by only one arm section 4. For example, the optical device for left eye 31L may be configured to be supported by only the arm section 4 on the left side or may be configured to be supported by the pair of arm sections 4.

In the embodiments, the arm section 4 is configured to be capable of turning about the turning shaft R2 parallel to the X axis substantially orthogonal to the viewing direction in the visual recognition by the user US. However, the invention is not limited to this. That is, various configurations for enabling the arm section 4 to turn about a connecting part to the headband section 2 may be adopted.

For example, in the configuration in which the display section 3 is supported by one arm section 4 and the configuration in which the optical device for left eye 31L is individually supported by the arm section 4 on the left side and the optical device for right eye 31R is individually supported by the arm section 4 on the right side, the arm section 4 may be enabled to turn about a turning shaft parallel to the Y axis.

For example, the arm section 4 may be enabled to turn about a turning shaft extending along a ZX plane and orthogonal to a viewing direction of the user US.

In the embodiments, the headband section 2 functioning as the main body section is formed in the substantially semicircular shape (the substantially U shape). However, the invention is not limited to this. That is, the headband section 2 only has to be configured to be capable of being disposed along the head of the user US (a part above a line that extends along the circumferential direction centering on the center axis of the head and passes both the eyes). For example, the headband section 2 may be configured to have, in at least a part thereof, an arcuate inner surface extending along to the head. For example, the headband section 2 may be configured such that a portion equivalent to the forehead and parts corresponding to the temporal regions are substantially orthogonal to each other. In this way, the external shape of the headband section 2 (the main body case 21) is not particularly limited as long as the headband section 2 can be disposed along the head by the band 22.

The headband section 2 includes the band 22 as the fixing section. However, the invention is not limited to this. That is, the configuration of the fixing section may be any configuration as long as the main body section can be fixed in a position where a virtual image displayed by the display section connected to the main body section via the arm section is visually recognized by the user US. For example, the fixing section may have a shape and a configuration that cover at least a part of the head of the user US (specifically, an upper portion in the head) like a cap or a helmet.

Specifically, as the configuration of the fixing section, a configuration of a head cap type worn to cover a fixed part, a crossing band type in which a plurality of bands extending along the fixed part crosses at the top of the head, or a belt type disposed to surround the periphery of the fixed part may be adopted. The fixing section may include two or more contact members set in contact with the fixed part to hold the fixed part from the front-back direction or the left-right direction of the user US and a coupling section that couples the contact member.

In the embodiments, the configuration is illustrated in which the arm section 4 is enabled to turn about the connecting part to the headband section 2 to make it possible to adjust the position of the display section 3. However, the invention is not limited to this. For example, a configuration may be adopted in which the arm section 4 includes the movable section and is capable of adjusting the position of the display section 3. The arm section 4 may be configured to be fixed to the headband section 2 and not to be enabled to turn and not to include the movable section, that is, the arm section 4 may be configured be set to a predetermined position and a predetermined angle of the display section 3 with respect to the headband section 2.

In the embodiments, as the moving mechanism 5, the configuration including the guiderail 51 provided on the display section 3 side and the slide member 52 provided on the arm section 4 side is illustrated. However, the invention is not limited to this. That is, the guiderail 51 may be provided on the arm section 4 side and the slide member 52 may be provided on the display section 3 side.

The moving mechanism 5 is not limited to the configuration for sliding the slide member 52 along the guiderail 51. The moving mechanism 5 only has to be a moving mechanism that can move the display section 3 close to and away from the headband section 2 by relatively moving the display section 3 and the arm section 4. For example, the arm section 4 connected to the display section 3 may be configured to be movable along the Y direction with respect to the headband section 2 functioning as the main body section.

In the embodiments, the image pickup section 23 is configured to be turned about the turning shaft R1 parallel to the X direction to be capable of adjusting an image pickup direction in a YZ plane, that is, in the up-down direction in FIG. 1. However, the invention is not limited to this. The image pickup section 23 may be configured to be capable of adjusting the image pickup direction in a direction other than the up-down direction, for example, the left-right direction or may be configured to be capable of adjusting the image pickup direction in the up-down direction and the left-right direction. The image pickup direction of the image pickup section 23 may be fixed. The image pickup section 23 may be not provided.

In the embodiments, the light guide members 313L and 313R are respectively fixed. However, the invention is not limited to this. For example, the light guide members 313L and 313R may be configured to be capable of turning about a turning shaft extending along the X direction independently from each other or in association with each other to the opposite side of the user US. In this case, by configuring the turning shaft to be located on the Y direction side or the opposite side of the Y direction in the light guide member 313, it is possible to turn the light guide member 313 to retract from the viewing direction of the user US.

In the embodiments, the configuration is illustrated in which the control board 24 is provided in the headband section 2. However, the invention is not limited to this. For example, the control board 24 may be provided in the display section 3 or the arm section 4.

In the embodiments, the configuration is illustrated in which the cable CB is drawn around on the inside of the headband section 2 and the cable CR is drawn around on the inside of the arm section 4 and thereafter drawn around on the inside the headband section 2 and connected to the control board 24. However, the invention is not limited to this. For example, a configuration may be adopted in which the cables CB and CR are drawn around on the outer side of the headband section 2 and the arm section 4.

In the embodiments, the controller that receives various kinds of input operation by the user US is connected to the virtual image display device 1. The virtual image display device 1 is controlled by the control board 24 according to an input from the controller. However, the invention is not limited to this.

For example, in the configuration in which the controller is connected to the virtual image display device 1, one of the virtual image display device 1 (an image display device) and the controller may be configured to have at least one of a function of acquiring operation information corresponding to operation by the user US, a function of acquiring image information and driving the display section 3 according to the image information, and a function of supplying electric power and the other may be configured to have the remaining functions.

The virtual image display device 1 (the image display device) may be connected to an image supply device (a PC, etc.) via the controller or may be directly connected to the image supply device not via the controller. In such a configuration, the virtual image display device 1 is used as an image display portion in the image supply device. The various operations of the virtual image display device 1 may be configured to be controlled by the image supply device. Note that, in this case, the image supply device may supply electric power for driving the virtual image display device 1.

A battery and a control device such as an image processing device may be disposed in the virtual image display devices 1 to 1D (e.g., the headband section 2 and the display section 3). Further, a slot for a memory card or the like may be provided in the virtual image display devices 1 to 1D. Further, an operation section that receives operation by the user US may be provided in the virtual image display device 1 or a configuration capable of detecting tap operation may be provided in the virtual image display device 1. That is, the controller does not have to be provided.

In the embodiments, the see-through type virtual image display device 1 is illustrated as the virtual image display device. However, the invention is not limited to this. That is, the invention can also be applied to a non-transmissive virtual image display device with which an outside scene cannot be observed and a video see-through type virtual image display device that displays a picked-up image picked up by an image pickup element that picks up an image of an outside world.

In the embodiments, the virtual image display device 1 may include, as configurations that generate image light, an organic EL (Electro-Luminescence) display and an organic EL control section. As configurations that generate image light, an LCOS (Liquid crystal on silicon; LCoS is a registered trademark), a digital micro mirror device, and the like can also be used. For example, the invention can also be applied to a head mounted display of a laser retinal projection type. That is, a configuration may be adopted in which an image generating section includes a laser light source and an optical system for guiding laser light source to the eyes of the user US, makes the laser light incident on the eyes of the user US to scan the retinas, and forms an image on the retinas to thereby cause the user US to visually recognize the image.

The invention is not limited to the configuration for modulating light with an LCD and generating image light. For example, the invention can also be applied to a display device that adopts a scanning optical system including a MEMS (Micro Electro Mechanical System) mirror and makes use of a MEMS display technique. That is, the image generating section 20 may include, as image display elements, a signal-light forming section, a scanning optical system including a MEMS mirror that scans light emitted by the signal-light forming section, and an optical member on which a virtual image is formed by the light scanned by the scanning optical system. In this configuration, the light emitted by the signal-light forming section is reflected by the MEMS mirror, made incident on the optical member, and guided in the optical member to reach a virtual-image forming surface. The MEMS mirror scans the light, whereby a virtual image is formed on a virtual image forming surface. The user US catches the virtual image with the eyes to recognize an image.

At least a part of the functional blocks shown in FIGS. 10, 13, 15, 18, and 20 may be realized by hardware or may be realized by cooperation of the hardware and software. The invention is not limited to the configuration in which the independent hardware resources are disposed as shown in the block diagrams. The computer program executed by the control section 140 may be stored in the storing section 120 or a storage device in the control device 300. The computer program stored in an external device may be acquired via the communication section 117 or the interface 125 and executed. Among the configurations formed in the control device 300, only the operation section 111 may be formed as an independent user interface (UI). The configurations formed in the control device 300 may be redundantly formed in the virtual image display device 1. For example, the control section 140 shown in the block diagrams may be formed in both of the control device 300 and the virtual image display device 1. The functions performed by the control section 140 formed in the control device 300 and the CPU formed in the virtual image display device 1 may be separated.

The entire disclosure of Japanese Patent Application No. 2015-086603, filed on Apr. 21, 2015 is expressly incorporated by reference herein.

What is claimed is:

1. A display device comprising:
   a display configured to electrically display an image while enabling visual recognition of real world outside scenery;
   a camera configured to capture an image in an image pickup range that overlaps a range visually recognized through the display;
   a coupling structure that includes at least one movable portion and that is configured to couple the camera to the display;
   a sensor that detects a motion amount;
   a memory that stores calibration data including a positional relationship between the camera and the display; and
   a processor configured to:
      derive another positional relationship between the camera and the display or a change in the positional relationship between the camera and the display, based at least on the detected motion amount, so as to update, in the memory, the calibration data containing the positional relationship between the camera and the display; and
      adjust a display position of a virtual image in the display on the basis of the updated calibration data stored in the memory;
   wherein the sensor is provided in the at least one movable portion and is configured to detect a motion amount in the movable portion as the detected motion amount.

2. The display device according to claim 1, wherein the at least one movable portion includes a turnable turning portion, and the sensor detects a turning amount in the turnable turning portion.

3. The display device according to claim 1, wherein the at least one movable portion is configured to be capable of moving stepwise, and the sensor detects the motion in the at least one movable portion stepwise.

4. The display device according to claim 1, further comprising a driving structure configured to move the at least one movable portion,
wherein the processor is further configured to:
acquire a motion amount in the movable portion based at least on a motion amount of the driving structure.

5. The display device according to claim 4, wherein the driving structure moves the movable section stepwise.

6. A display device comprising:
a display configured to electrically display an image for display while enabling visual recognition of real world outside scenery;
a camera configured to capture an image in an image pickup range that overlaps a range visually recognized through the display;
a coupling structure that includes at least one movable portion and that is configured to couple the camera to the display;
a first sensor configured to detect a movement of the display;
a second sensor configured to detect a movement of the camera;
a memory that stores calibration data including a positional relationship between the camera and the display; and
a processor configured to: derive another positional relationship between the camera and the display or a change in the another positional relationship between the camera and the display, based at least on the detected movement of the display and the detected movement of the camera, so as to update, in the memory, the calibration data containing the positional relationship between the camera and the display stored in advance.

7. The display device according to claim 6, wherein the first sensor is a first inertial sensor fixed to the display, and the second sensor is a second inertial sensor fixed to the camera.

8. The display device according to claim 6, further comprising:
a third sensor, which is a motion-amount detecting sensor, provided in the at least one movable portion and that is configured to detect a motion amount in the at least one movable portion,
wherein the processor is further configured to detect the positional relationship between the camera and the display based at least on the detected movement of the display, the detected movement of the camera, and the detected motion amount of the at least one movable portion.

9. A control method for a display device, the control method comprising:
controlling the display device,
wherein the display device comprises:
a display configured to electrically display an image for display while enabling visual recognition of a real world outside scene;
a camera configured to capture an image in an image pickup range of the camera that overlaps a range visually recognized through the display;
a coupling structure that includes at least one movable portion and that is configured to couple the camera to the display;
a sensor that detects a motion amount, and
a memory that stores calibration data including a positional relationship between the camera and the display, and
the controlling of the display device comprises:
deriving another positional relationship between the camera and the display or a change in the another positional relationship between the camera and the display, based at least on the detected motion amount, so as to update, in the memory, the calibration data containing the positional relationship between the camera and the display; and
adjusting a display position of a virtual image in the display on the basis of the updated calibration data stored in the memory;
wherein the sensor is provided in the at least one movable portion and is configured to detect a motion amount in the movable portion as the detected motion amount.

10. A control method for a display device, the control method comprising:
controlling the display device,
wherein the display device comprises:
a display configured to an image for display while enabling visual recognition of a real world outside scene;
a camera configured to capture an image in an image pickup range of the camera that overlaps a range visually recognized through the display;
a coupling structure that includes at least one movable portion and that is configured to couple the camera to the display;
a first sensor configured to detect a movement of the display; and
a second sensor configured to detect a movement of the camera; and
a memory that stores calibration data including a positional relationship between the camera and the display, and
the controlling of the display device comprises:
deriving another positional relationship between the camera and the display or a change in the another positional relationship between the camera and the display, based at least on the detected movement of the display and the detected movement of the camera, so as to update, in the memory, the calibration data containing the positional relationship between the camera and the display stored in advance.

11. A non-transitory computer readable medium comprising computer program instructions that, when executed by a processor of a display device, cause the processor of the display device to:
control the display device,
wherein the display device includes:
a display configured to electrically display an image for display while enabling visual recognition of a real world outside scene;
a camera configured to capture an image in an image pickup range of the camera that overlaps a range visually recognized through the display;
a coupling structure that includes at least one movable portion and that is configured to couple the camera to the display;
a sensor that detects a motion amount; and
a memory that stores calibration data including a positional relationship between the camera and the display, and
the computer program instructions, when executed by the processor of the display device, cause the processor of the display device to control the display device to:
derive another positional relationship between the camera and the display or a change in the another positional relationship between the camera and the display, based at least on the detected motion amount, so as to update, in the memory, the calibration data containing the positional relationship between the camera and the display; and adjust a display position of a virtual image in the display on the basis of the updated calibration data stored in the memory;

wherein the sensor is provided in the at least one movable portion and is configured to detect a motion amount in the movable portion as the detected motion amount.

12. A non-transitory computer readable medium comprising computer program instructions that, when executed by a processor of a display device, cause the processor of the display device to:

control the display device, wherein the display device includes:

a display configured to electrically display an image for display while enabling visual recognition of a real world outside scene;

a camera configured to capture an image in an image pickup range of the camera that overlaps a range visually recognized through the display;

a coupling structure that includes at least one movable portion and that is configured to couple the camera to the display;

a first sensor that detects a movement of the display; and a second sensor that detects a movement of the camera; and a memory that stores calibration data including a positional relationship between the camera and the display, and the computer program instructions, when executed by the processor of the display device, cause the processor of the display device to control the display device to:

derive another positional relationship between the camera and the display or a change in the another positional relationship between the camera and the display, based at least on the detected movement amount of the display and the detected movement amount of the camera, so as to update, in the memory, the calibration data containing the positional relationship between the camera and the display; and adjust a display position of a virtual image in the display on the basis of the updated calibration data stored in the memory.

* * * * *